US011531992B2

(12) United States Patent
Ritchie et al.

(10) Patent No.: US 11,531,992 B2
(45) Date of Patent: Dec. 20, 2022

(54) MESSAGING SYSTEM FOR ORGANIZATIONS

(71) Applicant: Apple Inc., Cupertino, CA (US)

(72) Inventors: Grant Ritchie, Los Gatos, CA (US); Gokul Thirumalai, Santa Clara, CA (US); Philomena Lobo, Santa Clara, CA (US); Robert Y. Loh, Sunnyvale, CA (US); Scott Lopatin, San Francisco, CA (US); Mithilesh Kumar, San Jose, CA (US); Austin Marusco, San Francisco, CA (US); Tommy Rochette, San Jose, CA (US); Aniket Zamwar, Sunnyvale, CA (US); Alexandre Perematko, Cupertino, CA (US); Daniel B. Pollack, San Jose, CA (US); Nicholas J. Circosta, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 100 days.

(21) Appl. No.: 15/721,590

(22) Filed: Sep. 29, 2017

(65) Prior Publication Data

US 2018/0336569 A1    Nov. 22, 2018

Related U.S. Application Data

(60) Provisional application No. 62/507,163, filed on May 16, 2017.

(51) Int. Cl.
*G06Q 30/00* (2012.01)
*H04L 51/046* (2022.01)
(Continued)

(52) U.S. Cl.
CPC ....... *G06Q 30/016* (2013.01); *G06F 16/2457* (2019.01); *G06F 16/29* (2019.01);
(Continued)

(58) Field of Classification Search
CPC ... G06Q 30/016; G06F 16/2457; G06F 16/29; H04L 47/00; H04L 51/02; H04L 51/046;
(Continued)

(56) References Cited

U.S. PATENT DOCUMENTS 7,437,358 B2    10/2008    Arrouye et al.
9,928,178 B1    3/2018    Solapurkar
(Continued)

FOREIGN PATENT DOCUMENTS

CN    105763417    7/2016
CN    105917626    8/2016

OTHER PUBLICATIONS

Google: "About Google My Business," Apr. 18, 2016, retrieved from https://web.archive.org/web/20160418091417/https://support.google.com/business/answer/3038063?hl=en-GB, 3 pages.
(Continued)

*Primary Examiner* — Dhairya A Patel
*Assistant Examiner* — Sujana Khakural
(74) *Attorney, Agent, or Firm* — BakerHostetler

(57) ABSTRACT

A messaging system, in one embodiment, can establish messaging accounts for a plurality of organizations (e.g., businesses) to allow customers or users of the organizations to conduct two-way messaging sessions between a customer and an organization. The messaging system can use a registration portal to allow an organization to set up a business/organization messaging account by providing account information. The account information can then be used to update one or more searchable databases that allow a customer to have multiple entry points into a messaging session with each of the registered businesses in the messaging system. For example, a search through a web browser or a map application can provide search results that contain
(Continued)

or otherwise provide access to a selectable messaging option that is presented on a customer's device.

30 Claims, 22 Drawing Sheets

(51) Int. Cl.
| | |
|---|---|
| H04L 65/1069 | (2022.01) |
| H04L 51/063 | (2022.01) |
| G06F 16/29 | (2019.01) |
| G06F 16/2457 | (2019.01) |
| H04L 67/141 | (2022.01) |
| H04L 51/02 | (2022.01) |
| H04M 1/72436 | (2021.01) |
| H04L 51/23 | (2022.01) |
| H04L 51/58 | (2022.01) |
| H04L 51/216 | (2022.01) |
| H04W 4/14 | (2009.01) |
| H04L 67/306 | (2022.01) |
| H04M 1/72445 | (2021.01) |
| H04L 51/222 | (2022.01) |

(52) U.S. Cl.
CPC ............ *H04L 51/02* (2013.01); *H04L 51/046* (2013.01); *H04L 51/063* (2013.01); *H04L 51/216* (2022.05); *H04L 51/23* (2022.05); *H04L 51/58* (2022.05); *H04L 65/1069* (2013.01); *H04L 67/141* (2013.01); *H04M 1/72436* (2021.01); *H04W 4/14* (2013.01); *H04L 51/222* (2022.05); *H04L 67/306* (2013.01); *H04M 1/72445* (2021.01)

(58) Field of Classification Search
CPC ....... H04L 51/063; H04L 51/16; H04L 51/30; H04L 51/38; H04L 65/1069; H04L 67/141; H04L 51/20; H04L 67/306; H04M 1/72552; H04M 1/72561; H04W 4/14
See application file for complete search history.

(56) References Cited

U.S. PATENT DOCUMENTS

| | | | | |
|---|---|---|---|---|
| 2001/0024497 | A1* | 9/2001 | Campbell | H04M 3/5191 379/265.09 |
| 2003/0120559 | A1 | 6/2003 | Don | |
| 2006/0093109 | A1 | 5/2006 | Van Natter | |
| 2007/0005713 | A1 | 1/2007 | LeVasseur | |
| 2007/0061301 | A1 | 3/2007 | Ramer | |
| 2007/0265873 | A1 | 11/2007 | Sheth et al. | |
| 2008/0201429 | A1* | 8/2008 | Barbell | G06Q 10/109 709/205 |
| 2010/0138901 | A1* | 6/2010 | Zhang | G06Q 30/0601 726/4 |
| 2010/0228701 | A1 | 9/2010 | Harris, III | |
| 2010/0250929 | A1 | 9/2010 | Schultz | |
| 2010/0262549 | A1* | 10/2010 | Kannan | G06Q 30/02 705/304 |
| 2010/0324961 | A1* | 12/2010 | Singh | G06Q 10/10 705/304 |
| 2011/0050576 | A1 | 3/2011 | Forutanpour | |
| 2011/0078270 | A1* | 3/2011 | Galli | G06Q 10/107 709/206 |
| 2011/0246287 | A1* | 10/2011 | Wright | G06Q 30/0246 705/14.45 |
| 2011/0320423 | A1 | 12/2011 | Gemmell | |
| 2012/0030021 | A1 | 2/2012 | Gupta | |
| 2012/0072261 | A1 | 3/2012 | Oberoi | |
| 2012/0210238 | A1 | 8/2012 | McCoy | |
| 2012/0245944 | A1* | 9/2012 | Gruber | G10L 15/26 704/270.1 |
| 2012/0309465 | A1 | 12/2012 | Tani | |
| 2012/0315607 | A1 | 12/2012 | Shin | |
| 2013/0252642 | A1 | 9/2013 | Park | |
| 2014/0136250 | A1 | 5/2014 | Lee | |
| 2014/0280612 | A1* | 9/2014 | Beslic | H04L 12/1818 709/206 |
| 2014/0358632 | A1 | 12/2014 | Graff et al. | |
| 2015/0172227 | A1 | 6/2015 | Grove, II | |
| 2015/0186430 | A1 | 7/2015 | Heffernan et al. | |
| 2015/0207725 | A1 | 7/2015 | Hui | |
| 2015/0235289 | A1* | 8/2015 | Jeremias | G06F 16/951 705/26.41 |
| 2015/0262188 | A1 | 9/2015 | Franco | |
| 2015/0312186 | A1 | 10/2015 | Giura | |
| 2015/0319203 | A1 | 11/2015 | Jeremias | |
| 2015/0341752 | A1 | 11/2015 | Flynn | |
| 2015/0358265 | A1 | 12/2015 | Kaplinger et al. | |
| 2015/0371265 | A1* | 12/2015 | Leisher | G06Q 30/0257 705/14.55 |
| 2016/0162555 | A1* | 6/2016 | Shapira | G06F 3/0482 707/722 |
| 2016/0165571 | A1* | 6/2016 | Malee | H04W 4/12 455/412.2 |
| 2016/0366088 | A1 | 12/2016 | Abou et al. | |
| 2017/0053286 | A1 | 2/2017 | Bhagat et al. | |
| 2017/0064035 | A1* | 3/2017 | Lai | G06K 9/00456 |
| 2017/0103432 | A1 | 4/2017 | Borchetta et al. | |
| 2017/0293982 | A1 | 10/2017 | Gupta | |
| 2017/0295119 | A1* | 10/2017 | Rosenberg | H04L 51/16 |
| 2017/0373997 | A1 | 12/2017 | Deng | |
| 2018/0096686 | A1* | 4/2018 | Borsutsky | H04L 51/02 |
| 2018/0152461 | A1 | 5/2018 | Albisu | |
| 2018/0357072 | A1 | 12/2018 | Karnati et al. | |

OTHER PUBLICATIONS

Anonymous: "XMPP—Wikipedia," Jul. 2, 2016, retrieved from ht://en.wikipedia.org/w/index.php?title=XMPP&oldid=727983386, 10 pages.
Extended European Search Report from European Patent Application No. 18171720.8, dated Jul. 13, 2018, 8 pages.
European Office Action from European Patent Application No. 18171720.8, dated Jun. 18, 2019, 6 pages.
Chinese Office Action from Chinese Patent Application No. 201810464528.2, dated Jun. 30, 2020, 25 pages including machine-generated English language translation.
International Search Report and Written Opinion from PCT/US2020/028483, dated Aug. 14, 2020, 13 pages.
Summons to attend oral proceedings from European Patent Application No. 18171720.8, dated Nov. 17, 2020, 9 pages.
Chinese Notice of Allowance from Chinese Patent Application No. 201810464528.2, dated Jun. 28, 2021, 4 pages including English language translation.
European Office Action from European Patent Application No. 18171720.8, dated Jul. 12, 2021, 17 pages.
Extended European Search Report from European Patent Application No. 21196142.0, dated Dec. 14, 2021, 7 pages.
Chinese Office Action from 202111067848.2, dated Aug. 26, 2026, 19 pages including English language translation.

* cited by examiner

Fields For Registration

- Company name, address(es), phone, business type, company contacts, URLs

- Brand information (e.g., name, logo, etc.)

- MSP (if selected)

- Locations (optional) (e.g., name, address, phone, open hours, URLs, etc.)

- Customizable fields

- Brand authorization (relationship, brand rep information) (optional)

- Limitations on amount of concurrent or new messaging sessions for organization or business (optional)

FIG. 4

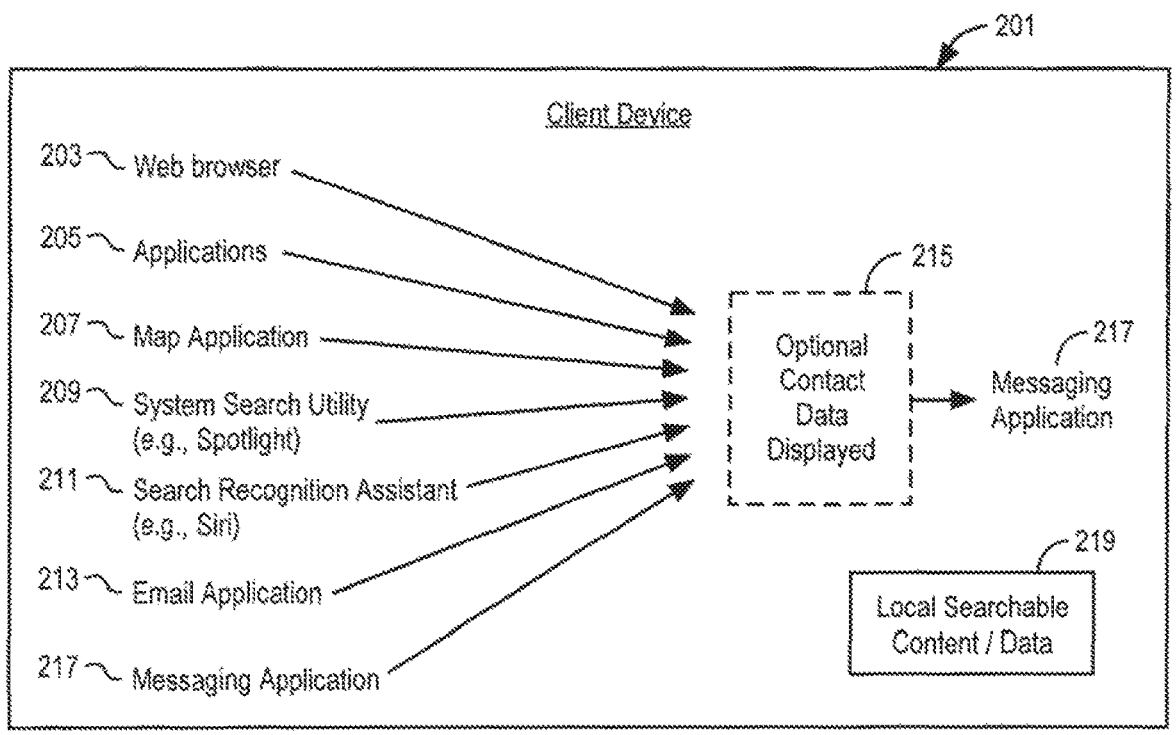

FIG. 5

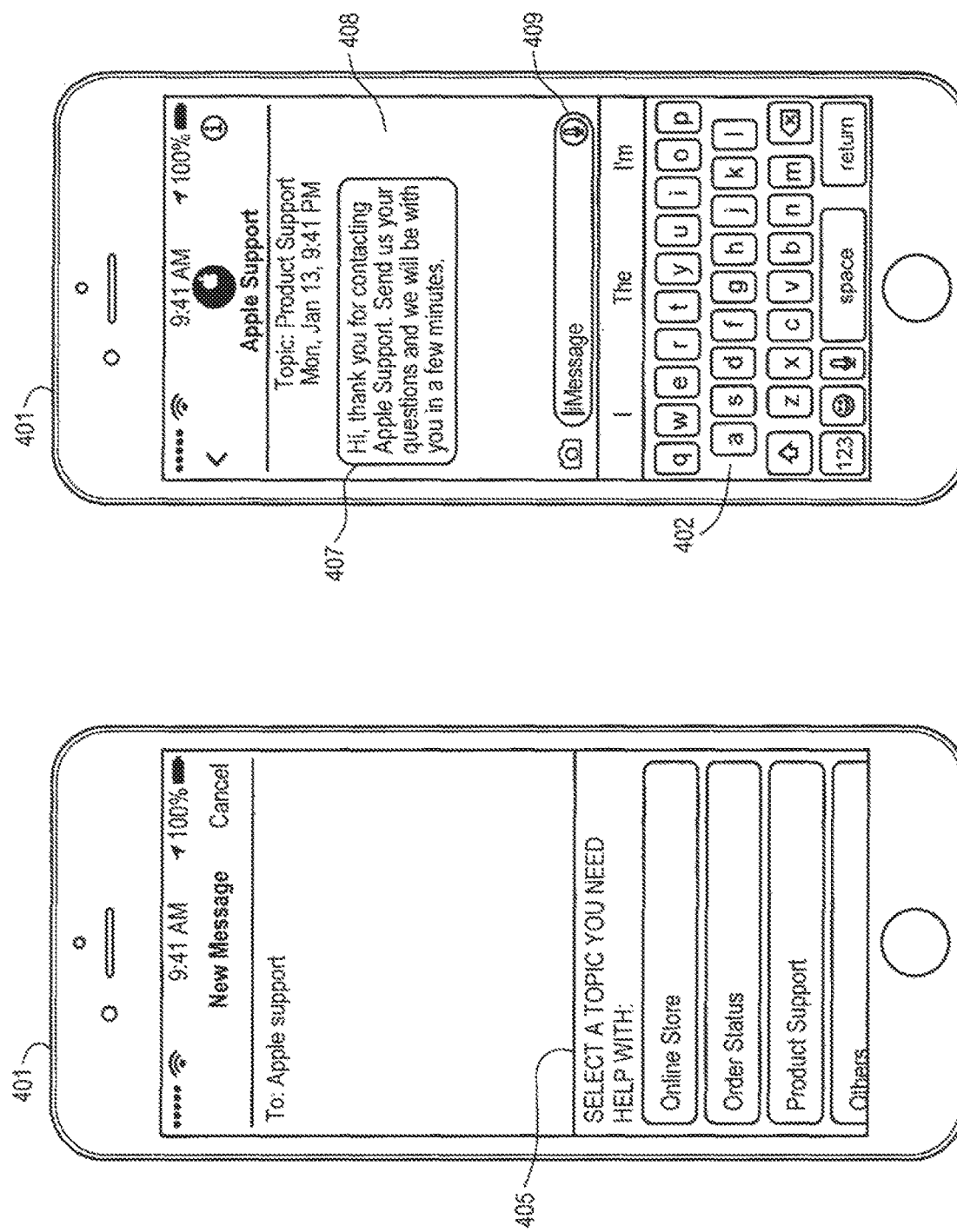

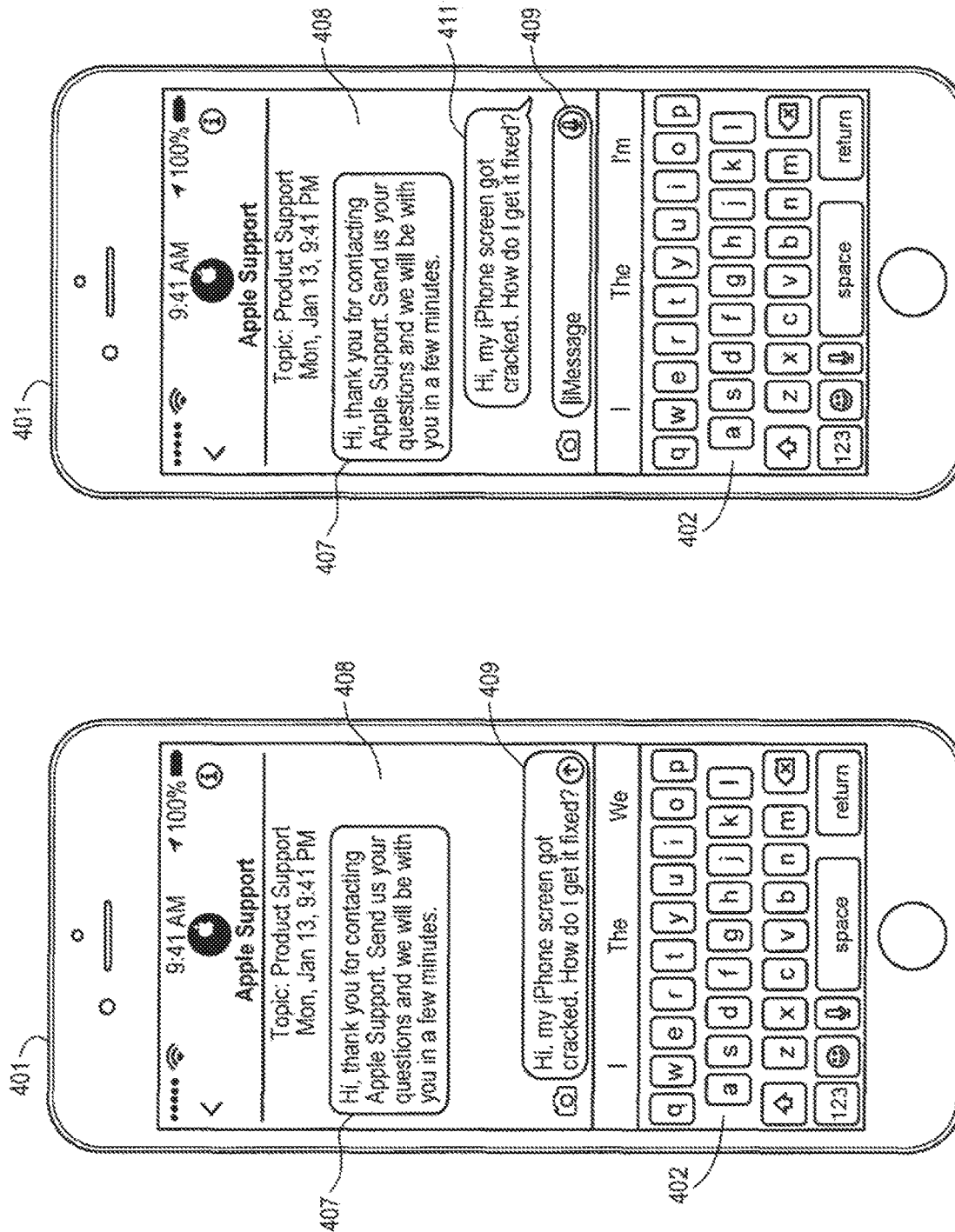

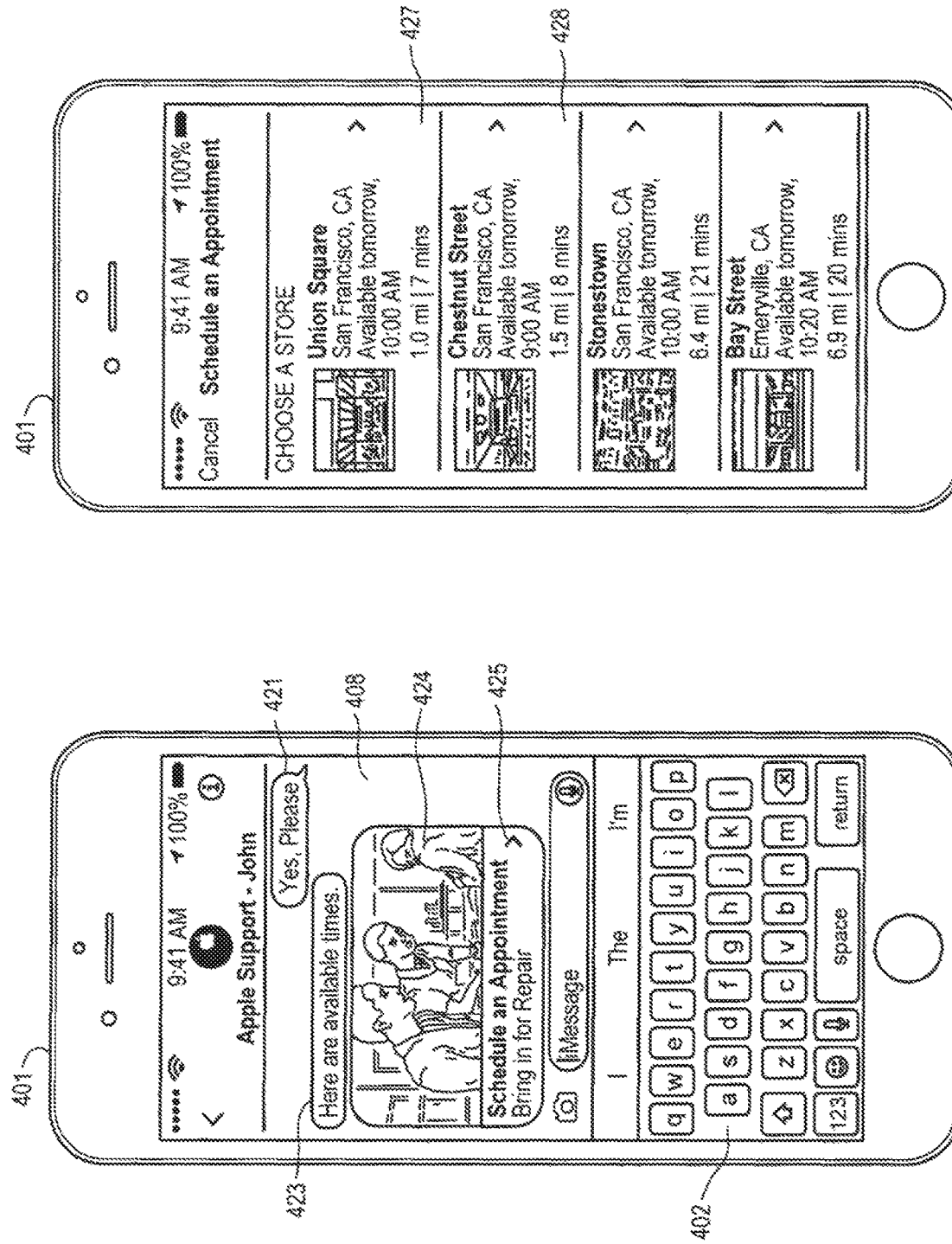

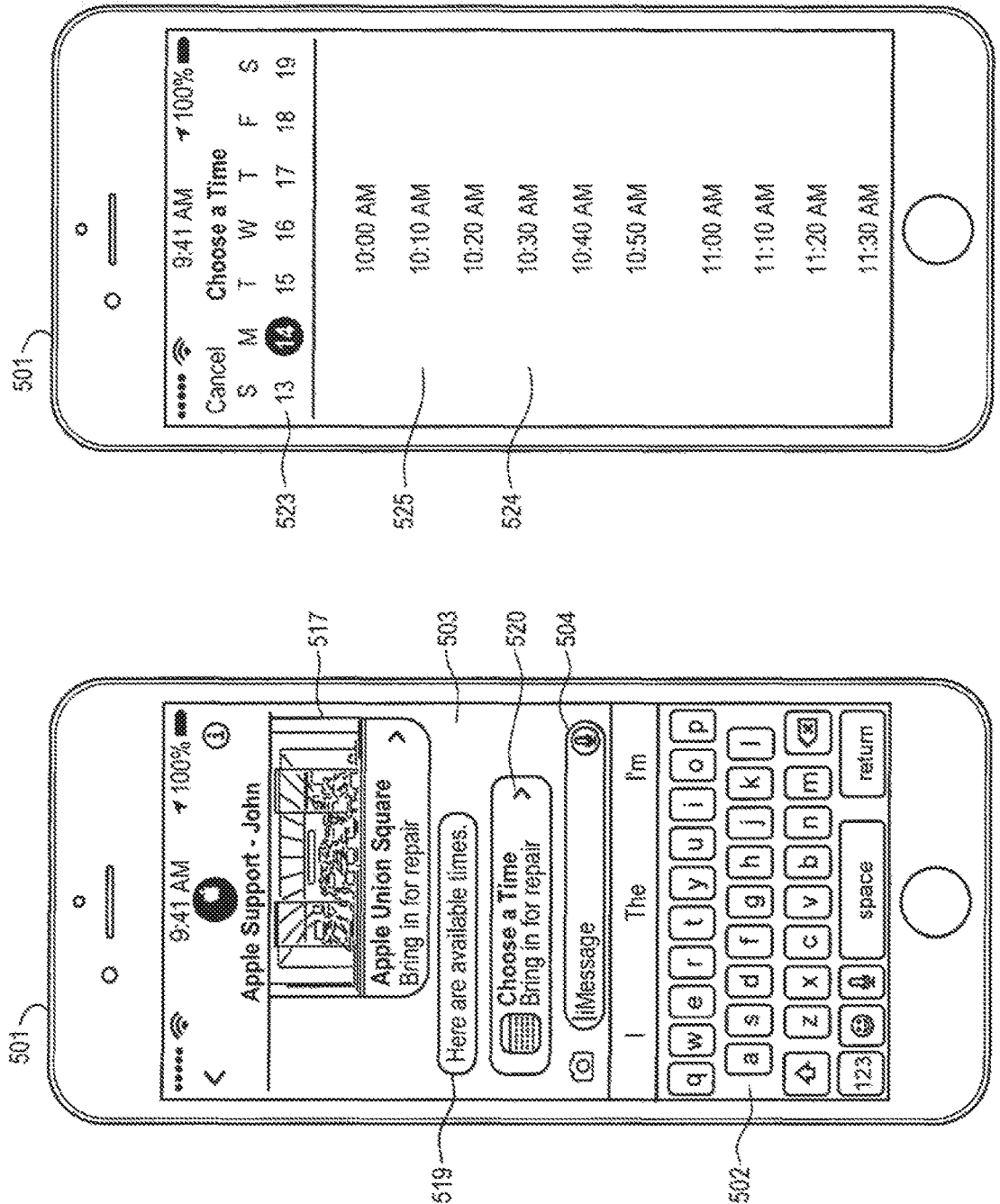

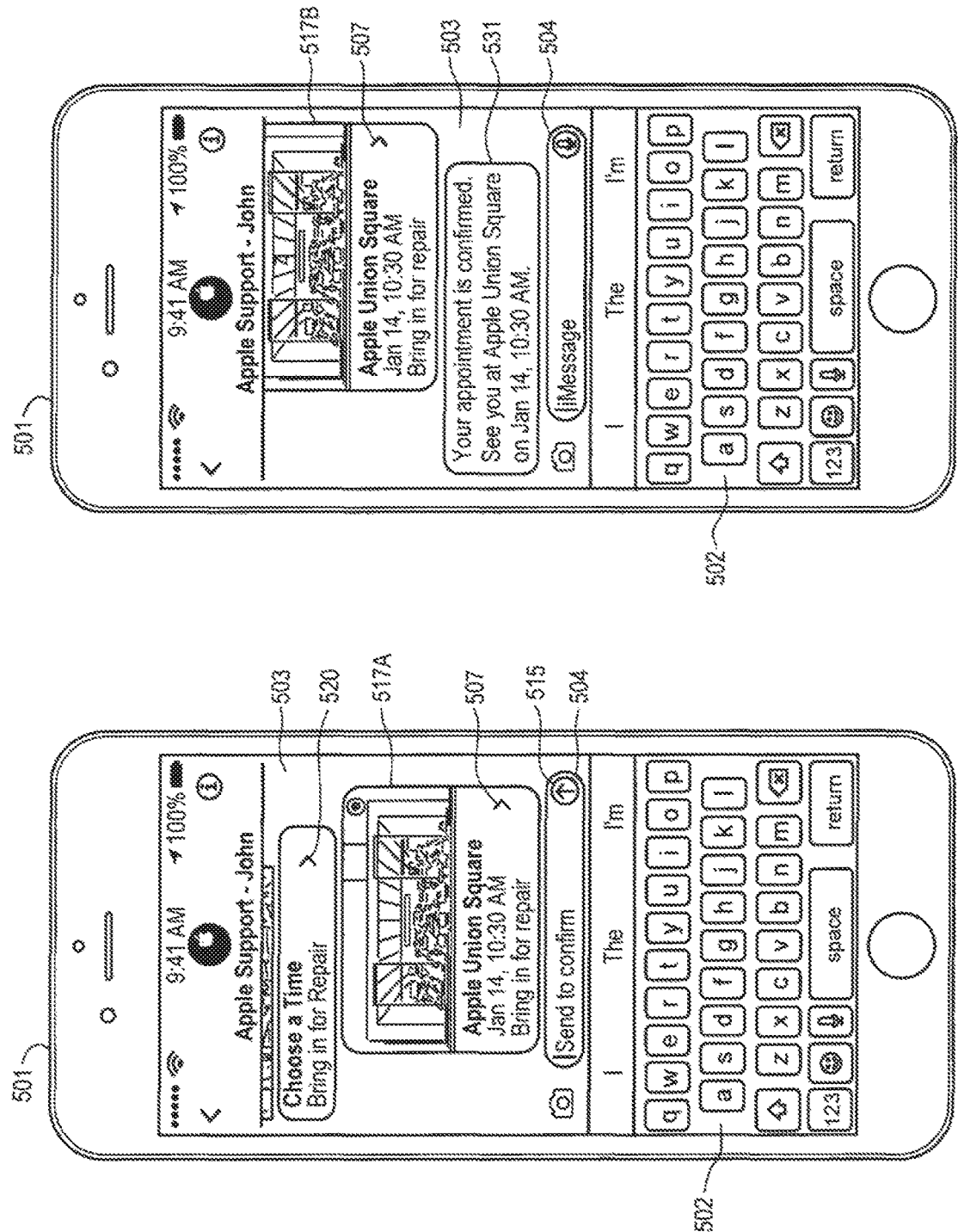

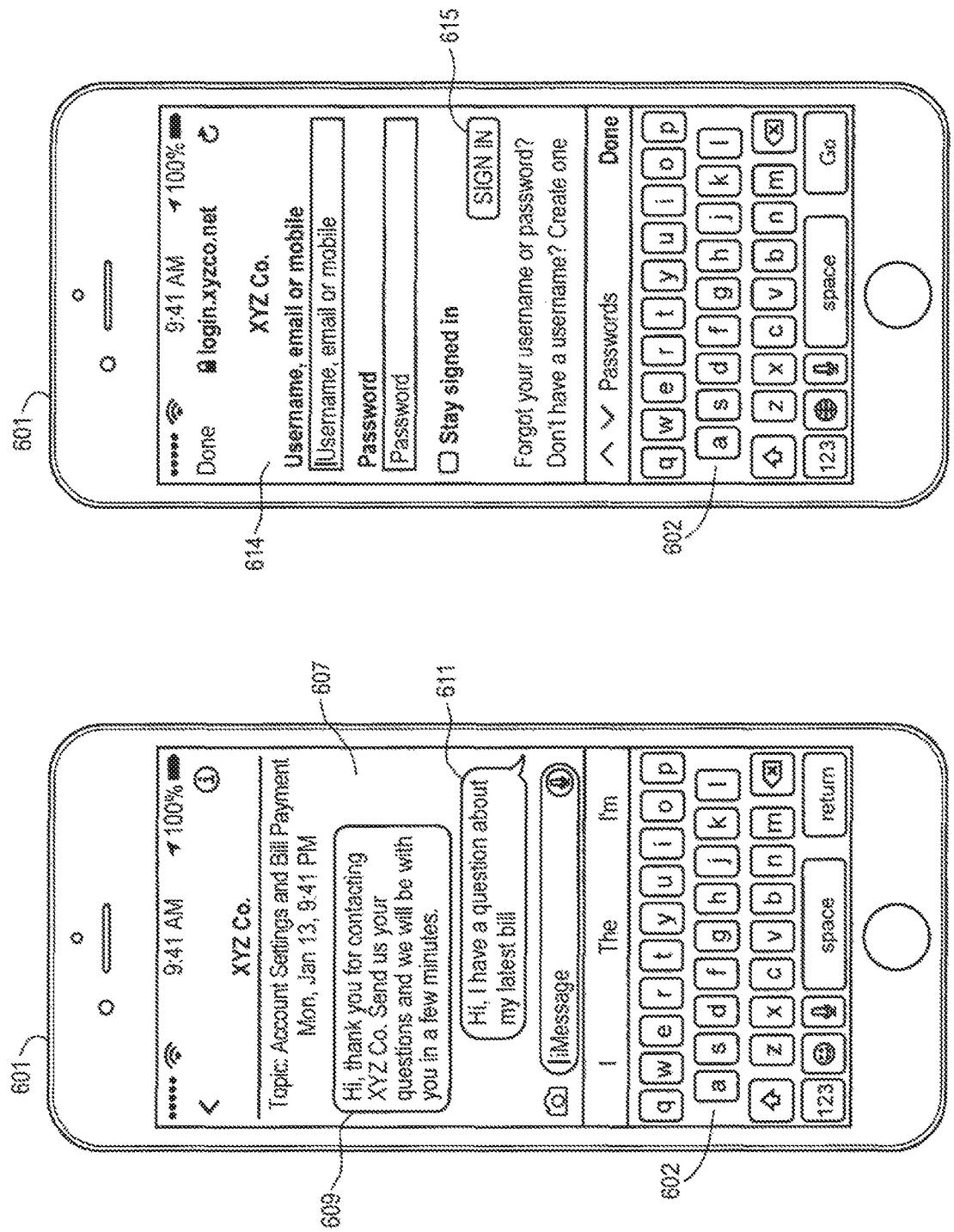

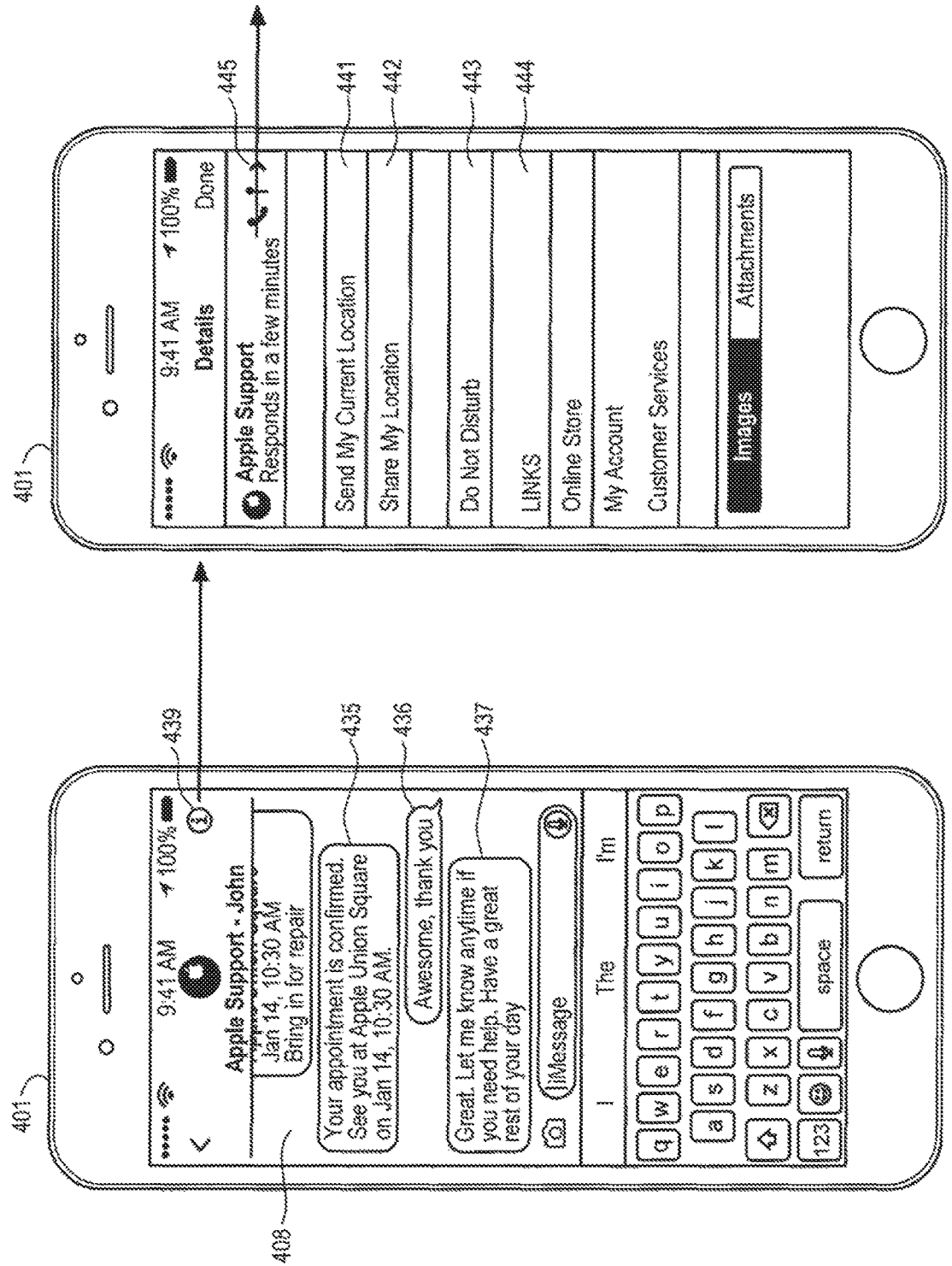

MESSAGING SYSTEM FOR ORGANIZATIONS

This application claims the benefit of U.S. Provisional Patent Application No. 62/507,163, filed May 16, 2017, which is incorporated herein by reference.

BACKGROUND

The embodiments described in this disclosure relate to messaging systems, such as online text messaging systems or systems based on the Short Message Service (SMS) on cellular telephones and smartphones or similar systems that allow users to send and receive test (and other content) in a near-instantaneous way if both users are "online."

The use of text messaging systems began many years ago. For example, wireless cellular telephone carriers, such as Verizon or AT&T, allowed text messages through the Short Message Service for cell phones in the 1990's before smartphones were available. Typically, the amount of data transmitted for SMS messages has been limited by rules established by the carriers. Recently, as the use of smartphones (e.g., iPhones) and tablet computers (e.g., iPads) has increased, the messaging systems have developed the ability to send images, such as photos or emojis or videos. In addition, messaging systems such as iMessage from Apple Inc. of Cupertino, Calif. have allowed users to also send and receive text and images through "public" networks which include "public" WiFi access points (e.g., at airports, coffee shops, etc.) and the Internet (in addition to using a wireless carrier's cellular telephone network).

SUMMARY OP THE DESCRIPTION

A messaging system, in one embodiment, can establish messaging accounts for a plurality of organizations, such as a plurality of businesses, to allow customers or users of the organizations to conduct two-way messaging sessions between a customer and an organization. The messaging system can use a registration portal to allow an organization to set up a business/organization messaging account by providing account information to a messaging system. The account information can then be used to update one or more searchable databases that allow a customer, who also has a messaging account with the messaging system, to have multiple entry points into a messaging session with each of the registered businesses in the messaging system. For example, a search through a web browser or a map application can provide search results that contain or otherwise provide access to a selectable messaging option that is presented on a customer's device and which can be selected by the customer or user to initiate a two-way messaging session with the business or organization.

In one embodiment, a method performed by a messaging system can include the following operations: storing and receiving account information from a plurality of organizations, wherein the account information is used to create one or more messaging accounts for each organization to conduct one or more messaging sessions with customers or users of each organization; updating one or more searchable databases to include at least a portion of the account information for each organization of the plurality of organizations; receiving a search query from a first user and performing a search through the one or more searchable databases using the received search query; and transmitting search results from the search, the search results transmitted to the first user's device, and the search results providing access to at least one displayed messaging option to initiate a messaging session with the first organization that is one of the organizations in the plurality of organizations. In one embodiment, the method can further include establishing, in response to the first user's selection of the displayed messaging option, a two-way messaging session between the first user's device and the first organization through one or more messaging servers that are part of the messaging system. In one embodiment, the one or more messaging servers are used by members of the public to send text messages and other content to other members of the public in addition to use by the organizations to conduct messaging sessions with the customers or the users of the organizations. In one embodiment, these members of the public own or use devices that include messaging applications that are configured to operate with the messaging servers in order to send the text messages and other content to other members of the public.

In one embodiment, the account information includes, for each organization, at least one or more of the following: (a) a messaging identifier for use by a messaging identification system, the messaging identifier specifying a cloud storage account for sending, receiving, and storing messages; (b) brand information for an organization; (c) data specifying to whom, within an organization, a messaging session is directed; (d) location information for one or more stores or facilities of an organization; (e) a selected messaging services platform (MSP) that acts as a helpdesk or surrogate for an organization; (f) data specifying one or more limitations on the amount of messaging sessions that can be initiated or concurrently maintained or established with an organization; or (g) one or more customizable fields that can be customized by an organization for use during messaging sessions with the organization. In one embodiment, the one or more searchable databases are updated to include some but not all of the account information for an organization. In one embodiment, at least some of the account information is stored on one or more of: (a) a message registry; or (b) a messaging identification system that uses one or more messaging identifiers of an organization to initiate a messaging session. In one embodiment, the two-way messaging session is established by the messaging identification system which provides connection or identification information about one or more devices of the first organization winch transmits messages through the one or more messaging servers. In one embodiment, the connection information can include push notification tokens that are used to push messages through the one or more messaging servers and the identification information can include cryptographic data that is used to generate encrypted messages.

In one embodiment, the one or more searchable databases provide multiple entry points to a messaging session with an organization such as the first organization. In one embodiment, the multiple entry points can at least include two or more of: (a) a search using a web browser; (b) a search using a map application which displays maps that can indicate a position of a user's device using one or more location services, such as GPS, etc.; (c) a search using a search utility application such as an application which is similar to Spotlight on Mac OS X or iOS; or (d) a speech recognition assistant that causes a search to be performed, such as the Siri speech recognition assistant on iOS devices. In one embodiment, the search utility application can search through local indexed content on a user's device and also cause a search through one or more searchable databases hosted on one or more systems that are remote from the user's device. In one embodiment, a two-way messaging session can include a first embedded data specifying a purpose or intent for the messages and second embedded data specifying a group within the first organization that is in the messaging session with a user or customer, and the first and second embedded data can be added by the organization during a messaging session. In one embodiment, a messaging system for organizations or businesses can maintain a data acquisition portal for receiving account information from the plurality of organizations to set up one or more messaging accounts for those organizations. In one embodiment, a users device can be identified to an organization by a phone number or email address or customer number. In one embodiment, account information for a customer of a business can be automatically provided with or auto populated in a message between the user or customer and the business.

In one embodiment, a messaging system or a search system can receive search queries from a plurality of customers of the plurality of businesses and return search results that are responsive to the search queries, and each of those search results provide access to at least one displayed messaging option which can be selected to initiate a messaging session with a business or organization which has established a messaging account through, for example, a data acquisition portal which receives account information.

In one embodiment, a business may update the account information to take into account new locations or facilities or to remove old locations or facilities which are no longer being used or add an MSP or change other parameters or controls associated with the business's messaging account. In one embodiment, the updated account information can then be used to update the one or more searchable databases with the updated account information to indicate new locations or to remove existing locations which are no longer supported by the business or organization. In one embodiment, a search result provided on a client device can also include contact information for a business or organization.

A method in one embodiment performed by user's device can include the following operations: displaying a messaging option for a first organization, wherein the messaging option is configured to establish a two-way messaging session with a customer or user of the first organization using first account information of the first organization, and wherein the first account information is maintained with other account information for a plurality of organizations by a messaging system that provides a messaging service to a plurality of user devices that are each configured with a messaging application designed to send and receive messages through the messaging system; receiving, on a user device, a selection of the messaging option within a non-messaging application; and establishing, in the messaging application on the user device, a two-way messaging session between the first organization and the user device using the first account information. In one embodiment the two-way messaging session can last for an extended period of time and be stored in a transcript of a conversation over that extended period of time such as over a week or month or several years, and the transcript can be stored on the user's device and one or more devices operated by the first organization. The conversation with the first organization can be displayed in a list of conversations on the user's device, and that list can include conversations with other users who are not businesses. Thus, a customer of a business can, through a user's device, initiate a messaging session with the business on Monday and turn off the user's device, and resume the messaging session two days later on the same or different user device and then resume the messaging session again on the following Monday with the entire set of messages stored in the transcript that defines the conversation with the business. In one embodiment, the first account information can specify whether a surrogate (e.g., an MSP) responds on behalf of the first organization, and can include data specifying one or more limitations on the amount of messaging sessions that can be concurrently maintained or established with the first organization. In one embodiment, a first, response from the first organization in the two-way messaging session can include an estimated response time or wait time. In one embodiment, this messaging option can be displayed through a search result of a search of one or more databases containing account information of a plurality of businesses or organizations. The searches through the one or more databases can provide multiple entry points to a messaging session with the first organization.

A method in one embodiment performed by a set of one or more data processing systems (e.g., a set of servers that form a messaging system) can include the following operations: receiving and storing account information from a plurality of organizations including a first organization, the account information used to create one or more messaging accounts for each organization to conduct one or more messaging sessions with customers or users of each organization through a messaging system that provides a messaging service to a plurality of user devices that each include a messaging application that is configured to send and receive messages through the messaging system, wherein a first account information for the first organization includes data specifying one or more limitations on the amount of online messaging sessions that can be initiated or maintained or established with the first organization; receiving a request, from a first user device, to initiate a messaging session with the first organization; determining whether an account of online messaging sessions between the first organization and a plurality of customers or users of the first organization exceeds the one or more limitations for the first organization; and initiating the messaging session between the first user device and the first organization when the determined amount does not exceed the one or more limitations.

The methods and systems described herein can be implemented by data processing systems, such as smartphones, tablet computers, desktop computers, laptop computers, server systems, and other data processing systems, and other consumer electronic devices. The methods and systems described herein can also be implemented by one or more data processing systems which execute executable computer program instructions, stored on one or more non-transitory machine readable media that cause the one or more data processing systems to perform the one or more methods described herein when the program instructions axe executed. Thus, the embodiments described herein can include methods, data processing systems, and non-transitory machine readable media.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of she accompanying drawings in which like references indicate similar elements.

FIG. 4 shows an example of fields which may be included in a registration database according to one or more embodiments described herein.

FIG. 5 shows an example of a client device which can be used by a customer or user of a business according to one or more embodiments described herein.

FIGS. 7A, 7B, 7C, 7D, 7E, 7F, 7G, 7H, 7I, 7J, 7K, 7L, 7M, and 7N show an example of a messaging session between a customer and a business according to one embodiment described herein.

FIGS. 9A, 9B, 9C, 9D, 9E, 9F, 9G, 9H, and 9I show another example of a messaging session between a customer and a business according to one embodiment.

FIGS. 10A, 10B, and 10C show an embodiment on a customer's device for authenticating the customer to a business according to one embodiment.

FIGS. 11A, 11B, and 11C show an example of business information being provided to a customer or user on the customer's device according to one embodiment.

DETAILED DESCRIPTION

Figure 1:
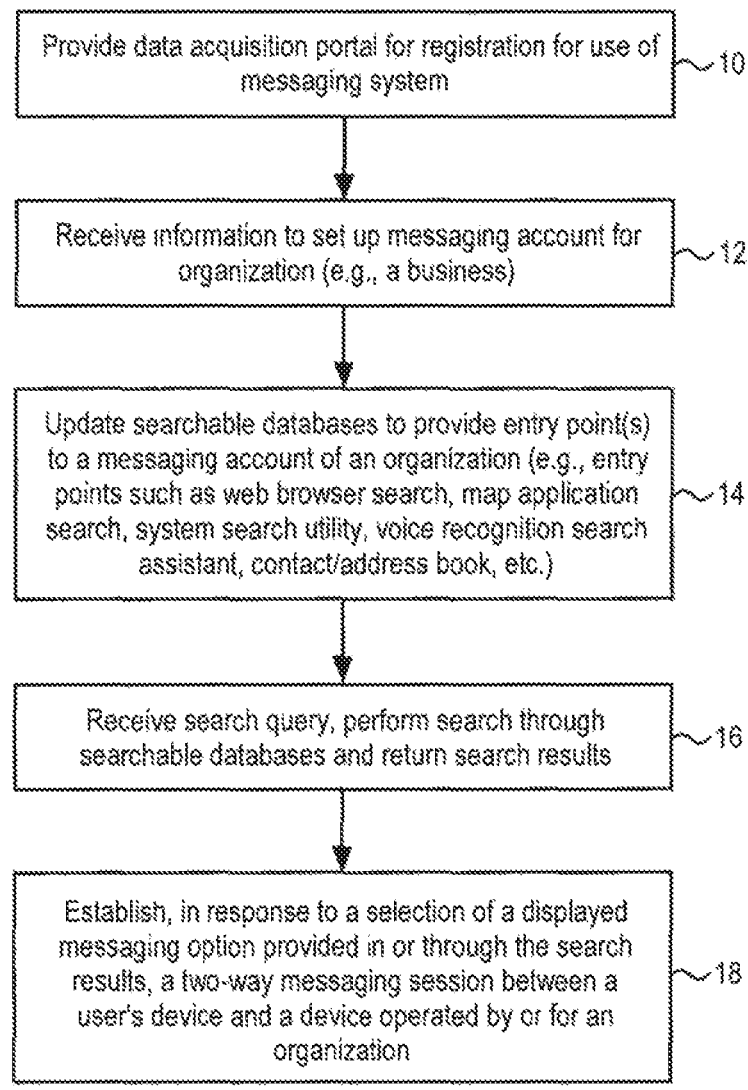
FIG. 1 is a flowchart which illustrates a method which can be performed by a messaging system according to one or more embodiments described herein.

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

The various embodiments described herein relate to messaging systems such as text messaging systems or "chat" messaging systems or other systems which allow devices to communicate messages between the devices. For example, iMessage from Apple Inc. of Cupertino, Calif. is an example of a messaging service for iOS devices and Mac (OS X) computers. Typically a messaging system includes a plurality of client devices, each including at least one messaging application and a set of one or more messaging servers that can receive messages front client devices and transmit messages to other client devices. A client device can be a communication device such as a smartphone, or tablet computer, or a desktop computer or a laptop computer or a wearable device, or an onboard computer, or other data processing systems or other consumer electronic devices. In one embodiment, the client device can include a conventional touchscreen that can both display images and also accept touch inputs from a user. The touch screen on the communication device can display the user interface of the messaging application which can include a message transcript and an on-screen keyboard below the message transcript. In addition, the user interface of the messaging application can include a username indicating the recipient, in one embodiment, of messages sent from the communication device during a messaging session. In addition, the user interface can include a text entry region which indicates the content of the text entered by the user before it is sent; in a sense, the text entry region is a test staging area indicating text that is ready to be sent to the recipient. Examples of various user interfaces for messaging applications are provided herein, such as, for example, FIGS. 7A through 7N as well as other figures.

Figure 3:
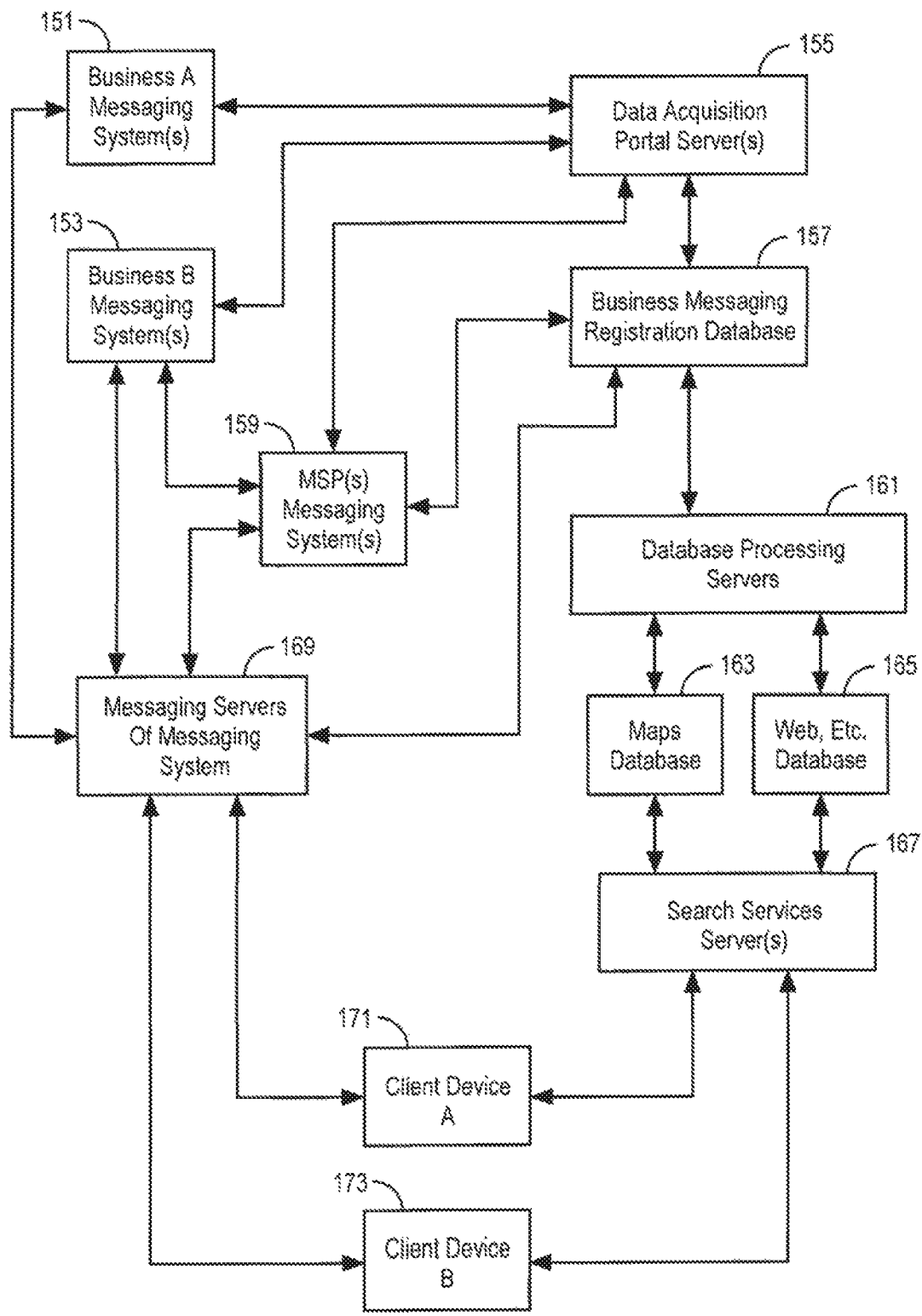
FIG. 3 shows an example of a messaging system which includes a plurality of client devices which can be operated by customers of businesses and which engage in messaging sessions with those businesses through the messaging servers after the businesses have established a messaging account.

FIG. 3 shows an example of a public messaging system that is extended to include businesses which register for messaging services through the same messaging system that supports members of the public. In one embodiment, each member of the public uses or owns a device configured with at least one messaging application to communicate with other similar devices through one or more messaging servers that are designed to allow the communication of messages between client devices or between a client device and a device operated by a business. In one embodiment, the messaging may be near instantaneous for users who are both online and active at the time of a messaging session. In a typical messaging system, there can be millions, of client devices communicating through a set of messaging servers and the messages (and attachments) can be encrypted using techniques known in the art. The messages can include rich content such as images, videos, animated content, etc. In one embodiment, one set of servers can receive and transmit text messages and another set of servers can be configured to receive non-text content, such as images or other attachments and provide those images or attachments in download operations to receiving devices in response to requests from those receiving devices to obtain the images or attachments. In the example shown in FIG. 3, client devices 171 and 173 may be smartphones, speakers with computing capability, or laptop computers with displays, any mixture of those, or other communication devices that are configured with one or more messaging applications to communicate with one or more messaging servers 169 which are part of a messaging system. In one embodiment, the messaging servers 169 can be servers which operate the iMessage messaging system from Apple Inc. of Cupertino, Calif. The messaging servers 169 can be part of a messaging system that can also include one or more identify servers and one or more servers for cloud based storage for temporary storage of messages (for delivery of messages to devices that were offline when a message was sent) and long term archival storage of messages and other related content such as attachments to the messages. The identity servers can register user devices and provide storage for identification and cryptographic information for each user device; for example, the identity servers can store one or more public keys for each user and tokens used to push messages, through the messaging servers, to designated recipients of the messages. Further information about a messaging system that includes messaging servers, identity servers and cloud storage can be found in U.S. Provisional Patent Application No. 62/466,325, filed Mar. 2, 2017, which application is incorporated herein by reference. As described further herein, the messaging system can also include systems (at one or both of the user client devices and the servers in the system) to manage settings or preferences for messaging sessions.

In the embodiments described herein, the messaging system can be extended to include businesses or other organizations, which register with the registration service through, for example, a data acquisition portal server 155 which can be one or more servers that serve as a portal to acquire data from businesses or other organizations which seek to register for a messaging service for businesses. In the example shown in FIG. 3, a business messaging system 151 and another business messaging system 153 can each be used, to both register for a business messaging service and also perform the operation of conducting messaging sessions with customers or users of the business. In addition, one or more messaging services platform (MSP) can also register to act as a helpdesk or surrogate for a business that is registered to conduct messaging sessions through the messaging system such as the messaging system shown in FIG. 3. For example, the messaging services platform can include one or more messaging systems 159 which can be laptop computers or smartphones or other devices configured to conduct messaging sessions as a helpdesk or surrogate for one or more businesses which have registered to conduct messaging sessions through a selected MSP. The messaging system operated by a messaging service can also include a business messaging registration database 157 which receives information to establish business messaging accounts through the data acquisition portal server 155. As described further below, at least some of the data from the business messaging registration database 157 can be provided to one or more data processing servers 161 which update one or more searchable databases with information from the business messaging registration database 157 as described further below. In one embodiment, these one or more searchable databases can include at least a maps database 163 and another database 165 which store information which can be searched by one or more search services servers 167 in response to search queries from one or more client devices, such as client devices 171 and 173. In an alternative embodiment, the databases 163 and 165 can be combined together into one database or be separated into more than two databases. The search services servers can also provide auto completion or auto suggestions for search inputs in one embodiment.

FIG. 1 shows an example of a method which can be performed by a messaging system. Reference is made to a non-limiting example of a messaging system of FIG. 3. Messaging system controls one or more messaging servers 169 as well as the data acquisition portal server 155 and the business messaging registration database 157 and the data processing servers 161 and the search services service servers 167 according to one embodiment. Such a messaging service can already provide messaging services for members of the public who own or use devices configured to operate with the messaging servers 169 to exchange messages, such as text messages and messages containing images and other content with other users who own devices or use devices that are configured to also operate with such messaging servers. In operation 10, a messaging service can provide one or more data acquisition portals for registration for the use of the messaging system. In one embodiment, these portals can be provided as webpages hosted by one or more data acquisition portal servers 155, and these webpages can provide one or more forms which can be completed by a business entity or other organization to provide information which is used in the registration process to create a messaging account for a business. For example, a messaging system 151 owned or controlled by business A can be used to access webpages provided by the data acquisition portal server(s) 155, and such systems 151 can provide information in connection with a new or updated business messaging account to be used by business A which controls or operates the one or more messaging systems 151. Similarly, one or more messaging systems 153 owned or operated by business B can access the one or more data acquisition portal servers 155 to enter information requested or required by the messaging system in order so enroll the business in a messaging account for a business. Similarly, one or more messaging services platforms (MSP), such as the MSP messaging systems 159 shown in FIG. 3, can also provide registration information to a messaging system in order to enroll the MSP service provider which can act as a helpdesk or surrogate for other registered businesses which request that the MSP provide helpdesk or other services to the registered business. In one embodiment, the business B can elect to use an MSP to provide helpdesk support for business B. The information requested or required by the registration process, which can be performed by one or more data acquisition portal servers 155, can include a variety of different information, such as company name, addresses, phone numbers, business type identification, company contacts, URLs, brand information, location information, customizable fields, brand authorization information, limitations on initiation of new messaging sessions based on the amount of current messaging sessions, etc. Such information which can be requested or required for registration of a messaging account for a business is described further below in conjunction with FIG. 4, which provides an example of various fields which can be required or requested in the process of a registration to create a business messaging account. The information provided by a business entity or other organization during the registration process is received in operation 12 shown in the method of FIG. 1, and this information can be stored in a business messaging registration database, such as the business messaging registration database 157 which can be coupled to the one or more data acquisition portal servers 155 as shown in FIG. 3.

After the registration information is stored in the registration database 157, at least a portion of that information can be provided to one or more database processing servers, such as the servers 161 in order to perform operation 14 in FIG. 1, which involves updating or more searchable databases to provide at least one ovary point to a messaging account of an organization such as a business. In one embodiment, multiple search able databases can be updated with the information from the registration database 157. In one embodiment, some but not all of the information in the registration database 15 is provided to the one or more searchable databases. Certain information may not be provided, such as information indicating limitations on the amount of concurrent or new or active messaging sessions or other message information or other registration information provided by a business during the process of registration for a business messaging account. Operation 14 shown in FIG. 1 can update a map database, such as map database 163 and other databases such as one or more databases 165, which can include information about websites, media content such as songs, movies, books, etc., encyclopedias, and current news or other news information, and information about social media (e.g., Twitter) and social media accounts, etc. Further information in connection with the other databases 165 can be found in pending U.S. patent application Ser. No. 14/503,138 filed on Sep. 30, 2014, and pending U.S. patent application Ser. No. 14/503,226 filed on Sep. 30, 2014; these applications are incorporated by reference herein. The updating of one or more searchable data bases with information from the business messaging registration database allows client devices to search for information about various businesses on their devices and obtain information about those businesses as a result of such searches. In one embodiment, the search results themselves can provide a selectable business messaging option which the user can select in order to initiate a messaging session with the selected business. In another embodiment, the selection of a messaging option in a search result for a business can provide contact information on a separate sheet or page or card displayed on the system before the user invokes a messaging system, and such information can include alternative mechanisms for contacting the business, such as email, telephone numbers, street addresses, and other information which can be used as an alternative to a messaging session. In one embodiment, the one or more searchable databases can provide multiple entry points to a messaging session with an organization, such as a business. For example, these entry points can include entering a messaging session from a search results page of a web browser search or entering a messaging session through the selection of a messaging option on a search result page from a search conducted in a map application, or entering a messaging session through the selection of a messaging, option on a search result page from a system search utility, such as Spotlight on iOS devices or Mac OS computers from Apple Inc. of Cupertino, Calif. Other entry points to a messaging session with an organization which has an established business messaging account can include search results from a search using a maps application or service, contacts or address hook application or service, a voice recognition search assistant, such as Siri from Apple Inc. The updating of the searchable databases can include the entry of a plurality of data from she registration process, such as at least some of the data shown in FIG. 4 for a particular business, and this information can then be searched for by one or more users and the results of these searches can bring up information about the business, including a selectable user interface icon such as a messaging option icon displayed on a screen of a user device which can allow the user to select the icon to launch a message session with the business.

After one or more businesses or other organizations register for business messaging accounts and their information is updated into the one or more databases, searches can be performed on that information to yield search results which include a selectable messaging option that can be selected by a user to invoke or initiate a messaging session with a business or other organization. In one embodiment, the initiation of a messaging session can begin through search results provided in response to a search query which can be received in operation 16 by the one or more search services servers 167 which can be part of the same system owned or controlled or operated by the messaging service which provides the one or more messaging servers 169. The search results can be obtained after a search through the one or more searchable databases, such as databases 163 and 165 and the results from these searches can be returned to the client device and displayed on the client device in a user interface, such as the user interfaces shown in FIGS. 6A and 6B. As described further below, these search results can be filtered or processed to determine whether or not to display messaging options with the search results. A user can then select one of the displayed messaging options (e.g., a chat or messaging icon) corresponding to a messaging account of a business or other organization in order to initiate and establish a two-way messaging session between the users device and a device operated by or for the business or organization as shown in operation 18 in FIG. 1. In one embodiment, the business or organization can include an initial response which indicates an estimated wait time or estimated response time to the user's initiation of the messaging session.

In one embodiment, the messaging session may not occur if the business has imposed a limitation on the amount of messaging sessions that can be initiated or concurrently maintained or established with the business or organization. The number of existing messaging sessions already in progress with the business can be compared with a threshold set by the business to determine whether to restrict new messaging sessions before they axe initiated; if the number of existing messaging sessions exceeds the threshold, then new messaging sessions can be throttled so they are not initiated, while if the number of existing messaging sessions is less than the threshold, the new messaging sessions are not throttled and cars be initiated. Further, other aspects such as recency in time of a messaging session can also be taken into account when deciding whether to throttle the initiation of new messaging sessions with the business. For example, the business or organization may impose a limitation based upon whether the user is active or inactive, which can be a binary decision based on, for example, recency of contact or messaging if the user has recently engaged, in a messaging session with the business. For example, if the business decides to impose such a limitation then the most recent messaging session can be evaluated for recency to determine whether it is recent enough to be considered active. If it is too old or stale then the user may be characterized as an inactive user and may not be able to establish a messaging session if too many messaging sessions are already in progress at the current time (relative to a threshold value set by the business) with the business organization. In another embodiment, multiple valises based on recency or other criteria, such as purchases or amount of purchases or other criteria may be used to determine whether the user is given immediate or delayed access to a messaging session with the business. In another embodiment, if a user closes a conversation, the business or organization can receive a message indicating such closure and cause the user to be moved to an inactive status. Other techniques for limiting access by "inactive" users or customers of a business during heavy messaging traffic can be used to throttle the number of concurrent messaging sessions for a business in order to ensure adequate support for customers of a business for the most active users or customers of the business.

Figure 6A:
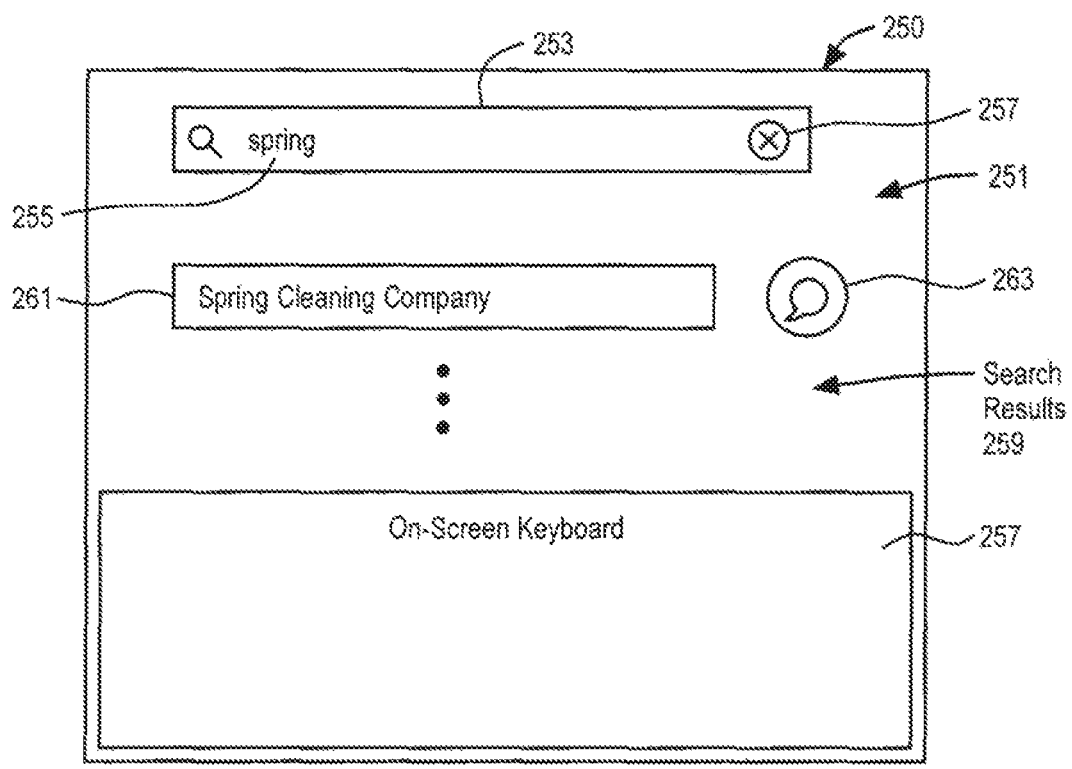
FIG. 6A shows an example of an entry point for beginning a messaging session with a business through the use of search results displayed on a client device operated by a customer of a business having a messaging account.

In one embodiment, the search results that are returned (e.g. search results returned in operation 16 of FIG. 1) can be filtered or checked against conditions (e.g., limitations to throttle initiation of messaging sessions for a business) or other criteria that are evaluated to determine whether or not to display, in the search result, a messaging option (such as messaging option 263 shown in FIG. 6A). The filtering or checking can occur prior to returning (e.g. transmitting) the search results to a client device or can occur after transmitting the search results, and one or both of the search server (or other servers) and client device can perform the filtering or checking. The conditions or other criteria can include (1) business factors; or (2) user specific factors; or (3) messaging service factors. The business factors can include one or more of (a) the current time is outside of a specified time period in which the business conducts messaging sessions (e.g., local current time is 3:00 am and the business is closed) or (b) the business has communicated, a signal to the messaging service to not initiate new messaging sessions; or (c) specified limitations for throttling initiation of new messaging sessions are currently exceeded, where the limitations can be specified in the business's account information and the throttling can be automatically performed by not showing a messaging option for the business in the search results when the limitations are exceeded for the business. The user specific factors can include a requirement for authorization data which validates that a user device is authorized to conduct a messaging session with the business; the business can require such data when the business is, for example, in a test mode and wants to limit access to its messaging sessions to only authorized users (e.g. employees of the business). The messaging service factors can include a setting used by the messaging service to stop a business's use of the messaging service (e.g., the business engages in illegal activities and a government body requests the messaging service to cease providing messaging sessions for the business).

In one embodiment, the messaging session for a business may be performed by a surrogate, such as a messaging services platform (MSP) that can act as a helpdesk or surrogate for a business or organization in order to conduct messaging sessions; for example, a messaging services platform can act as a helpdesk for a business and respond to messages from customers or users of the business and hence act as a surrogate for the business. In one embodiment, the account information specified by a business during the business registration process to establish a business messaging account can include information which specifies one or more messaging services platforms that can act as a helpdesk or surrogate for the business for the purposes of conducting messaging sessions with customers or users of the business or organization. In one embodiment, the MSP can register the business with the messaging service and can generate an API (Application Programming interface) prefix for the MSP and a set of publically accessible http endpoints so that the MSP can conduct messaging sessions on behalf of the business. Further details of one particular embodiment for using MSPs are provided in the Appendix.

In one embodiment, some or all of the account information can be stored on a message registry stored on one or more servers by the messaging system and/or a messaging identification system that uses one or more messaging identifiers of an organization or business in order to initiate a messaging session. In one embodiment, the messaging identification system can include one or more identification servers that receive identification information from a messaging application on a device, and this messaging identification information can be used to determine the account associated with the device and other information associated, with the device in order to establish a messaging session with the device and another device which is also configured to operate with the messaging system. In one embodiment, a messaging session can be established by the message identification system providing connection information about one or more devices of a business in order to allow a user or customer, of the business to establish a messaging connection with the system of the business. In one embodiment, the connection information can include one or more push notification tokens that are used by each device in the messaging session in order to allow push messages to be conveyed to recipient devices during a messaging session.

In one embodiment, a business or organization can embed information within the messages during a messaging session, such as embedded data specifying a purpose or intent for the message and other embedded data such as embedded data specifying a group or location within the business which is responsible for receiving and sending messages during a messaging session with a customer or user of the business or organization. The data specifying a purpose or intent for the messages can be a way for the business or organization to characterize or categorize a topic or purpose for a messaging session. Several examples are provided herein for such topics or purposes in order to allow the business or organization to route the messaging session to the appropriate people within a business organization in order to conduct the messaging session properly. For example, the data specifying a purpose or intent may specify that the messaging session is in connection with a repair for a customer or user of the business or may specify that the purpose or intent of the messages in a particular messaging session relates to an order status or other transaction in connection with the business or organization.

Figure 2:
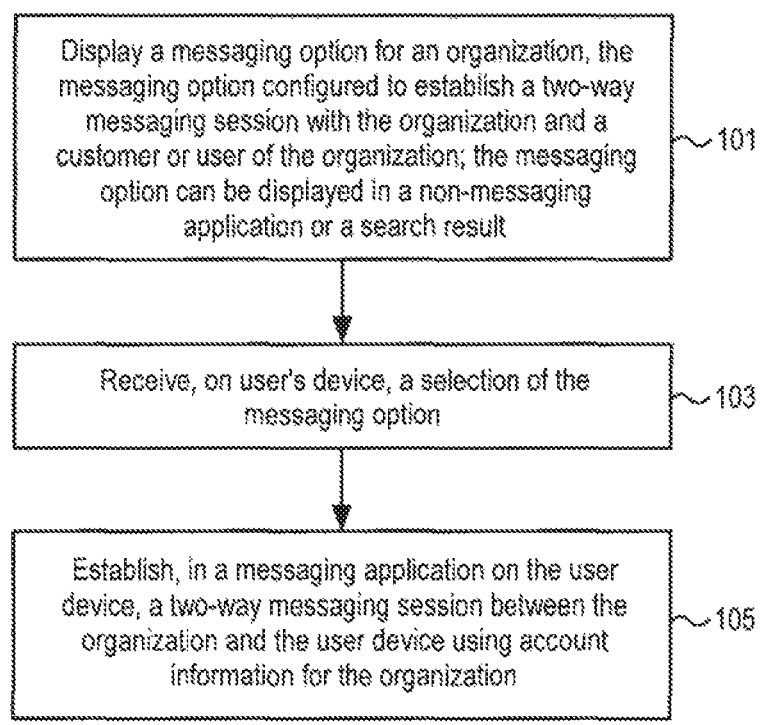
FIG. 2 is a flowchart which illustrates a method which can be performed on a client device or user device which is in communication with one or more messaging servers.

A method which can be performed by a client device, such as client device 171 or 173 shown in FIG. 3, will now be described while referring to FIG. 2. In operation 101, a client device can display a messaging option for an organization such as a business and this messaging option can be selected by a user and, when selected. It can establish a two-way messaging session with the organization and the user's device which displays the messaging option. In one embodiment, the messaging option can be displayed in a non-messaging application or within a search result such as the examples shown in FIGS. 6A and 6B. In one embodiment, the messaging option can be a chat or messaging button which a user can select to initiate the messaging session. Examples of such displayed messaging options include messaging option 263, shown in FIG. 6A, messaging option 313 shown in FIG. 6B and messaging option 404 shown in FIG. 7B. When the messaging option is selected by a user of a client device, the messaging application can use information associated with the messaging option, including, for example, a messaging identifier for use by a messaging identification system which can be used to specify or obtain the appropriate messaging connection information in order to establish the messaging session with an organization such as a business. In one embodiment, the messaging identifier can specify a cloud storage account for sending, receiving and storing messages. When a messaging option is selected in a non-messaging application, a call to the messaging application can be generated and can include the messaging identifier for use by a messaging identification system in order to establish the messaging session with the organization. This call can occur in response to receiving on the user's device, a selection of the messaging option, which is shown as operation 103 in FIG. 2. In response to that selection, the user's device, such as client device 171 or client device 173 establishes, in a messaging application on the user device, a two-way messaging session between the organization and the user device using account information for the organization. In one embodiment, the organization can then provide as an immediate or near immediate response, an estimated response time or wait time, and examples of such estimated response time or wait time are provided further below. In one embodiment, the two-way messaging session can last for an extended period of time and be stored in a transcript of the conversation over that extended period of time, and the transcript can be stored on the user's device and on one or more devices operated by the organization. The conversation with the organization can be displayed in a list of conversations on the user device, and that list can include conversations with other users who are not businesses. Moreover, the conversations in the list can be archived (e.g. in cloud storage) and be synchronized across different devices of the same user. Thus, a customer of a business can, through a user's device, initiate a messaging session with the business on Monday and then turn off the user's device, and then resume the messaging session two days later on the same or different user device and then resume the messaging session again on the following Monday (on the same or different user device) with the entire set of messages stored in the transcript that defines the conversation with the business.

FIG. 4 shows an example of various data fields which can be used during a registration process in which a business sets up a messaging account through the use, for example, of a data acquisition portal server, such as the one or more data acquisition portal servers 155. In one embodiment, a representative of the organization such as a business can use a web browser to get access to the portal, which can then present the various data fields to allow someone to enter data into those fields as part of the registration process to obtain a business messaging account. While some of the information may be required other information can be optional, such as whether the business wants to use a messaging service platform (MSP), or whether the business wants to specify locations or use customizable fields or wants to specify brand authorization or wants to specify limitations on the amount of concurrent messaging sessions for the business. Some of the information required by these data fields can include company name, one or more addresses for the company, one or more phone numbers, a specification of one or more business types that the business engages in, one or more company contacts and one or more URLs. The business may also specify brand information such as a logo or name which can be a trademark or service mark, of the business in one embodiment. If the business desires to use an MSP as a helpdesk or surrogate to receive and respond to messages with customers or users of the business, then the business can specify or select one or more messaging service platforms to serve as a helpdesk or surrogate for the business. If the business has one or more physical locations which can be a store or other facility, the business can also specify those locations including the name of the location, the address of the location, one or more phone numbers, the hours of business in which the business is open and available to service customers, one or more URLs, etc. The data fields may also include one or more customizable fields that can be specified by a business and used in certain messaging sessions. The data fields used in the registration process can also include information in connection with brand authorization indicating the brands that the business is authorized to carry or sell in one embodiment. Further, one or more of the data fields in the registration process can include fields designed to accept configuration data specifying limitations on the amount of concurrent messaging sessions for the business and this data can be used to throttle the initiation of new messaging sessions for the business. These limitations can take a variety of different forms and can be based upon whether or not a user is considered active or inactive. In one embodiment, the limitation may be a binary on or off limitation that defines users or customers as active or inactive. Active users or customers may be defined as those who have conducted a messaging session with the business in the last, for example, six months. In other words, the characterization of a customer or user as active or inactive can be based upon recency of a messaging session in one embodiment. In other embodiments, the characterization of a business user or customer as active or inactive can be based upon other criteria, such as the number of purchases or the amount of purchases in a currency value, etc. In one embodiment, the limitation can be dynamically adjusted over time by the business entity modifying settings in the business's messaging account and changing one or more values in the messaging account with respect to these limitations.

Figure 11C:
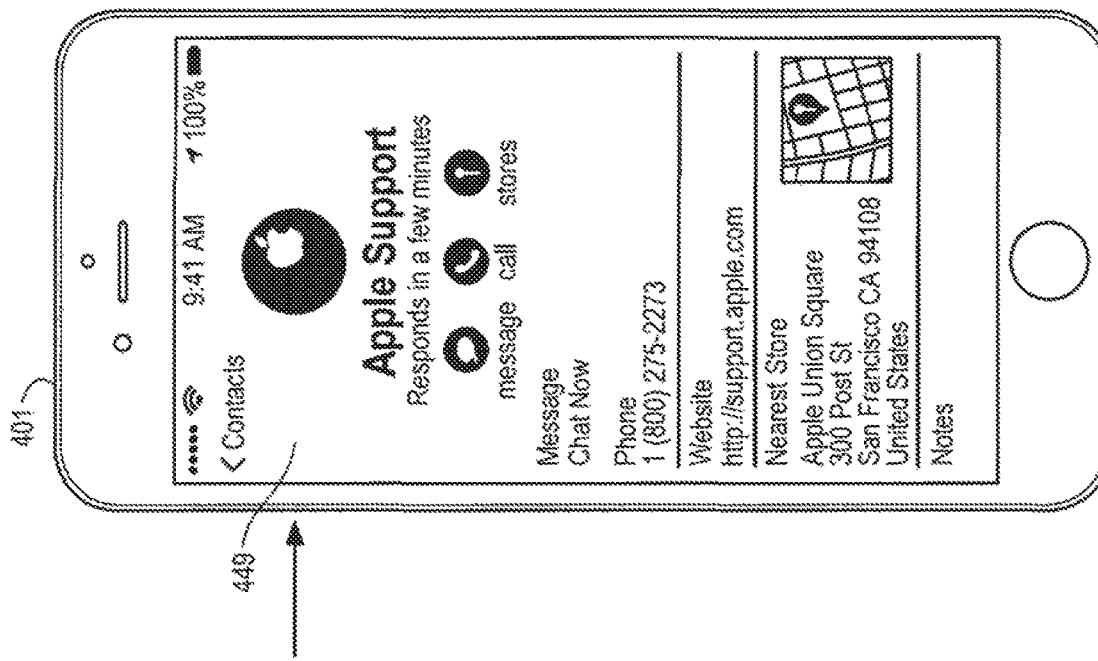

FIG. 5 shows an example of a client device 201 which can include a plurality of different software applications that can execute on the client device 201 and that can be used as an entry point into a messaging session provided by a messaging application, such a messaging application 217 shown in FIG. 5. For example, the client device 201 can include a web browser 203, one or more user applications 205, a map application 207, a system search utility application 209 such as Spotlight, a search recognition assistant 211 such as Siri on iOS devices and on OS X computers, an email application 213 and the messaging application 217. Other applications on client device 201 that can provide an entry point into a messaging session can include: a contact/address book application; a dialer application; a wallet application; or a QR code application that receives an image and processes the image to extract a request to initiate a messaging session with a business. The user of the client device 201 can enter search queries into the web browser 203 or the map application 207 or the system search utility 209 or the search recognition assistant 211, and in each case search results can include one or more messaging options which can be selected by a user to initiate or establish a messaging session with a business which has established a business messaging account as described herein. In one embodiment, the selection of the messaging option may immediately invoke the messaging application 217, causing the messaging application to appear and causing an initial response from the business to initially appear either immediately or nearly immediately. In the case of the system search utility 209, the search may be performed through local searchable content 219 which can be indexed full-text content stored on the client device 201, as well as indexed metadata stored on the client device 201 and further information in connection with such a system wide search utility can be found in U.S. Pat. No. 7,437,358 which is hereby incorporated herein by reference. In addition, the system search utility 209 may also cause a search of remote content such as a search of the maps database 163 and a search of the database 165 which can include text content and content such as images, songs, movies, etc. The searching of the database 165 to provide content back to the client device through the system search utility 209 can be implemented using one or more of the embodiments described in the following published U.S.

patent applications which are hereby incorporated herein by reference: U.S. patent application Ser. No. 14/503,138 filed on Sep. 30, 2014, and pending U.S. patent application Ser. No. 14/503,226 filed on Sep. 30, 2014. In one embodiment, the selection of the messaging option can cause the display of a business card or contact sheet or other contact information for a business prior to initiating or establishing a messaging session with the business; this can be done to allow the user to browse the contact information before engaging in a messaging session to ensure the user has selected the appropriate business. FIG. 11C shows an example of contact data which can be displayed either prior to the initiation of a messaging session or during a messaging session with the business. In one embodiment, both the system search utility 209 and the search recognition assistant 211 can search both the local searchable content 219 as well as the remote databases, such as database 163 and database 165. Further, in one embodiment, the web browser may also search the maps database 163 and the database 165 when performing a search based upon a search query entered into the web browser 203. The applications 205 can be, for example, an application provided, by the business which includes a messaging option such as a chat button which can be selected by the user to initiate a messaging session with the business.

In one embodiment, a business may also send an email to a client device which can then be displayed by an email application on the client device, such as email application 213, and this email can include a messaging option such as a chat button or messaging button within the email. The messaging option within the email can be selected by the user, which can then cause the initiation or establishment of a messaging session with the business.

FIG. 6A shows an example of a set of search results, which can be provided by, for example, a search by the web browser 203 or a search by the system search utility 209 or a search by the search recognition assistant 211 (e.g. Siri from Apple Inc.) in one embodiment. The window 250 includes a text entry field 253 which shows the entered text 255 which was entered by the user as the search query. The user can delete the entered text by selecting the delete button 257 and enter new text into the text entry field 253 to cause a new search to be performed. The text can be entered through an on-screen keyboard, such as on-screen keyboard 257 shown in the lower portion of window 250 in FIG. 6A. The list of search results 259 can include a search result 261 for a particular business which has established a business messaging account according to one or more embodiments described herein. The search result for that business includes a messaging option 263 which can be also referred to as a chat button. In one embodiment, messaging option 263 is not displayed in the search result if the one or more limitations on the number of messaging sessions with the business causes throttling of the initiation of new messaging sessions. If the user selects the messaging option 263 by, for example, touching or tapping or clicking the messaging option 263, then a messaging session can be initiated and established with, the business associated with that messaging account. In this case the business is known as the "Spring Cleaning Company" as shown within the search results 259.

Figure 6B:
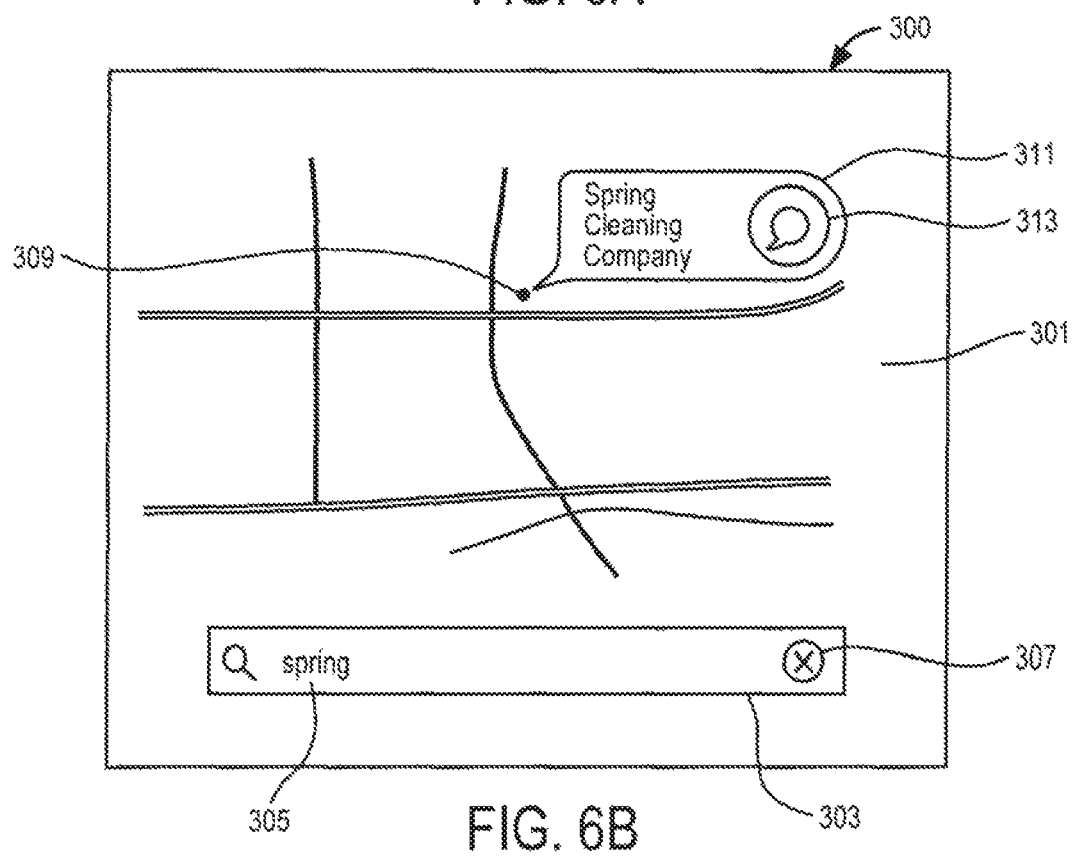
FIG. 6B shows another example of an entry point into a messaging session according to one embodiment.

FIG. 6B shows an example of search results from a map application, such as map application 207. A map is displayed by the map application within window 300 and the user has selected a particular location 309 which is associated with a business that was found by the search performed by the map application 207. The search input shown as entered text 305 appears within the text entry field 303, and the user can invoke a new search by selecting the delete button 307 and entering new text into the text entry field 303. In the example shown in FIG. 6B, the user has selected the location 309 which is the location for a business known as the "Spring Cleaning Company" as shown by the information bubble 311, which is associated with the location 309 shown on the map within window 300. The information bubble 311 includes a selectable messaging option 313 which the user can select to initiate a messaging session with the company associated with the messaging account established by the "Spring Cleaning Company" through the one or more embodiments described herein. Selecting the messaging option 313 can immediately invoke or launch a messaging application, such as messaging application 217, or in an alternative embodiment, a contact sheet or other contact information or business card of the business can be displayed prior to initiating or launching the messaging application. In one embodiment, the messaging option 313 is not displayed in the map or bubble 311 if the initiation of new messaging sessions has been throttled by limitations set by the business.

In addition to performing a search and showing search results that include one or more chat buttons, a speech recognition assistant can also recognize a user's spoken request to either initiate or resume a messaging session with a business. For example, a user can speak "send a message to Spring Cleaning Company" and the speech recognition assistant can recognize this spoken phrase as a request to initiate a messaging session (if not previously established) or resume a previously established messaging session.

Figure 7B:
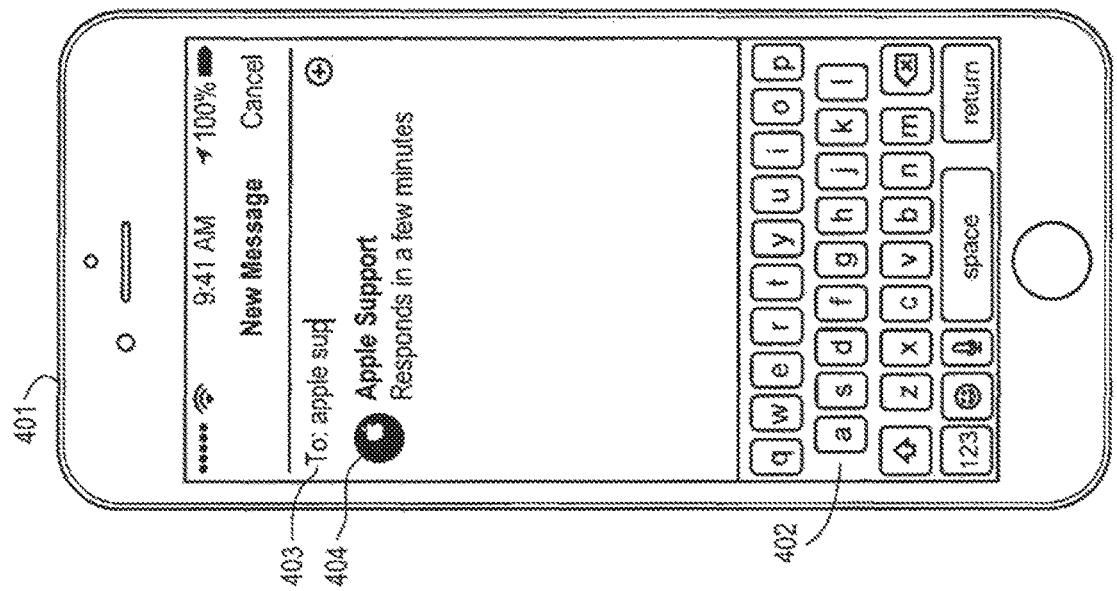
Figure 7A:
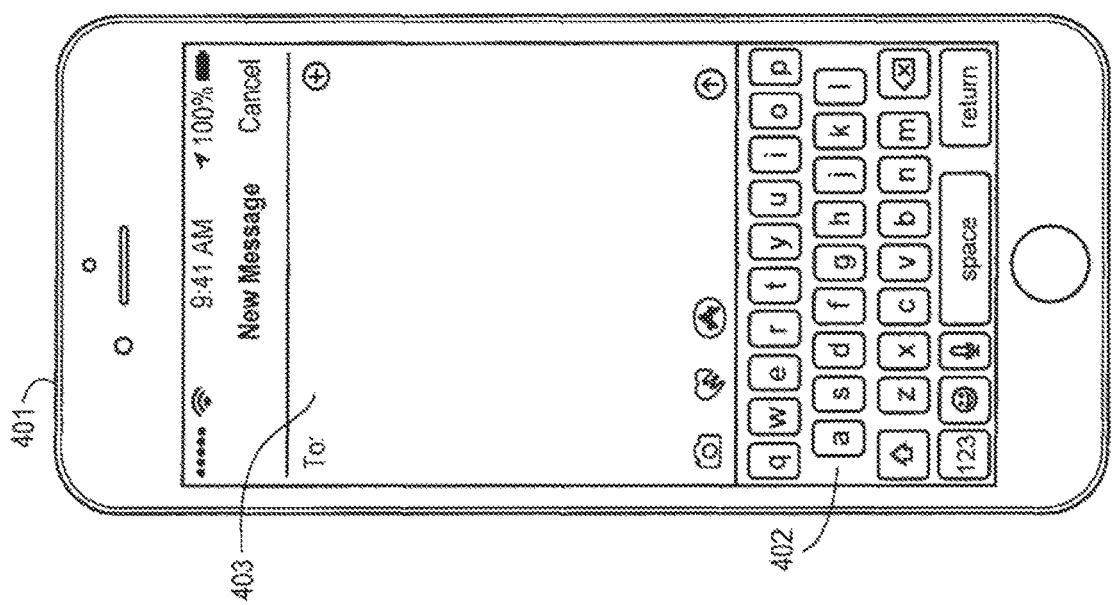
Figure 7H:
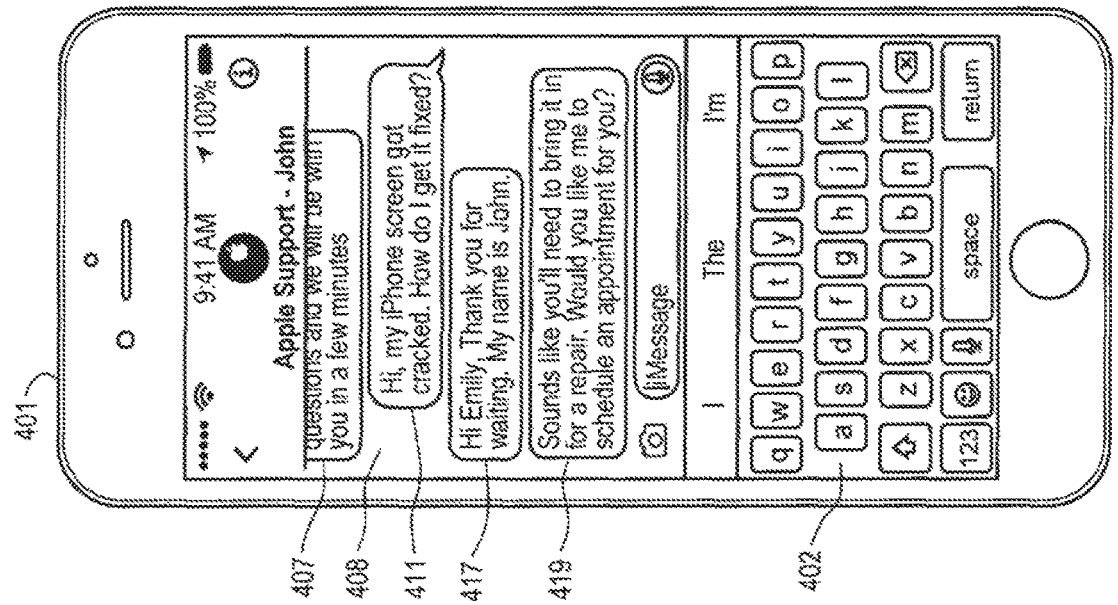
Figure 7G:
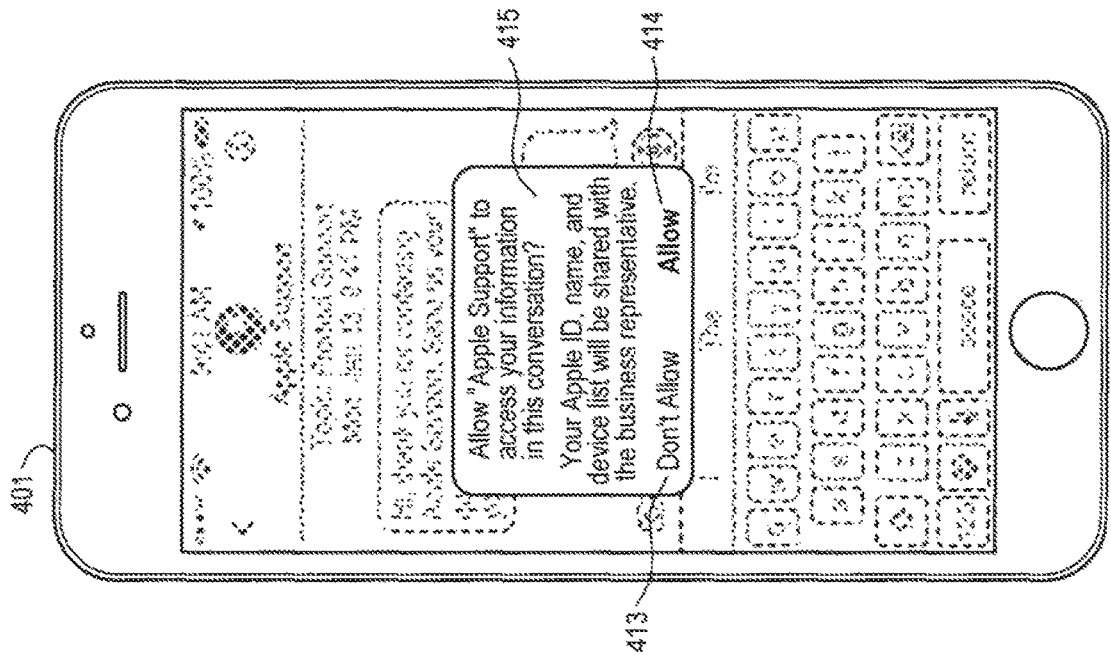
Figure 7L:
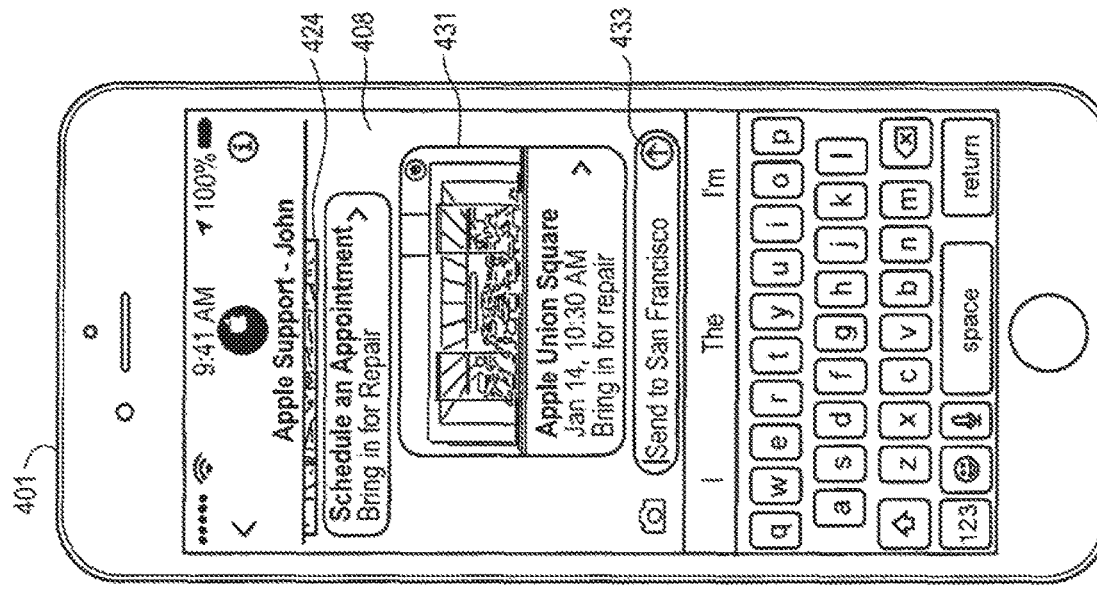
Figure 7K:
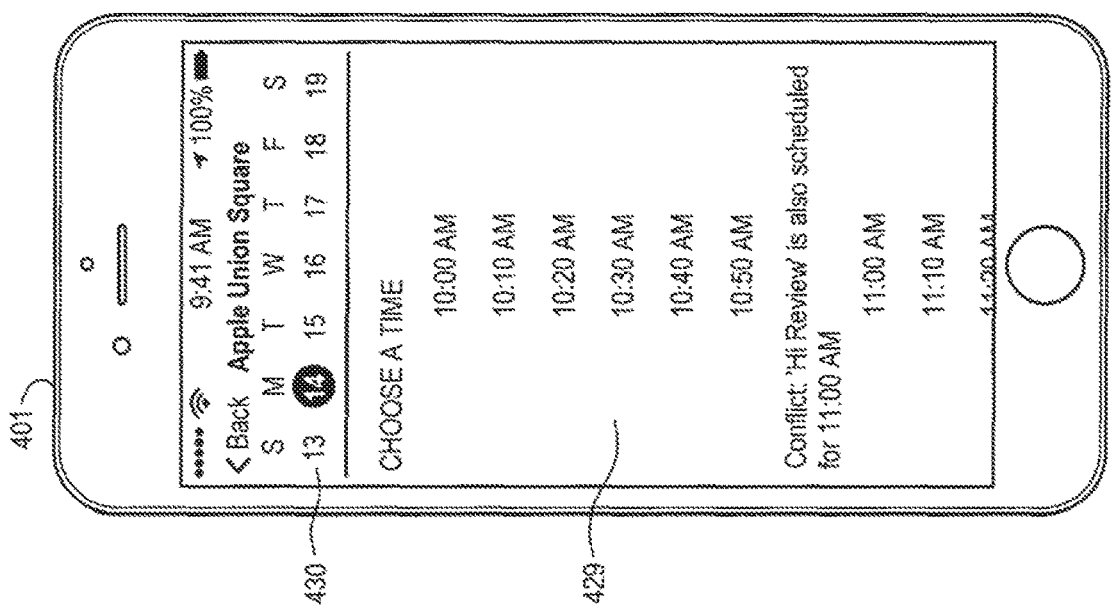
Figure 7N:
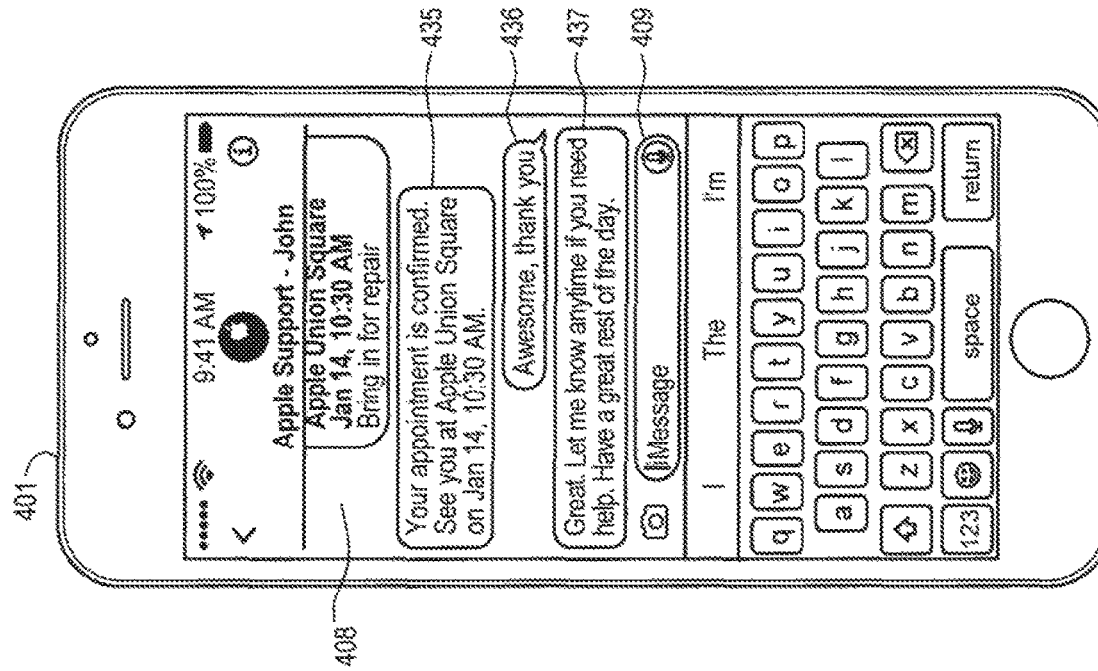
Figure 7M:
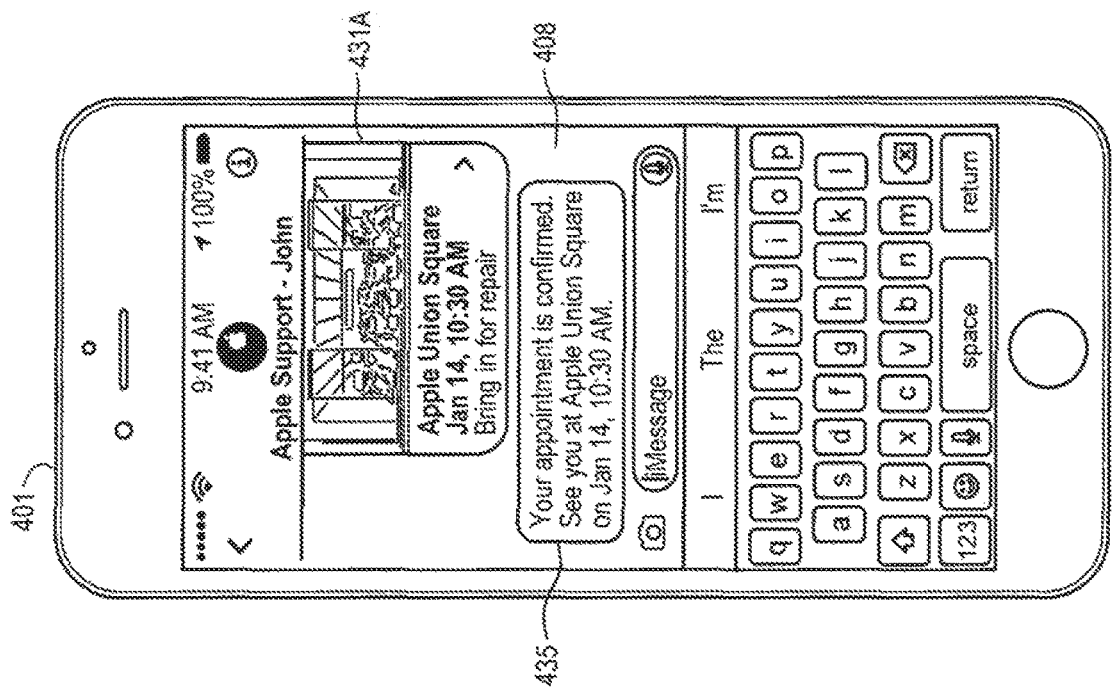

FIGS. 7A through 7N show an example of a messaging session between a business and a customer of the business according to one embodiment. The messaging session is shown on a smartphone 401 which can be the customer's device and can be similar to client device 171 or client device 173, which communicates through one or more messaging servers 169 with one or more messaging systems at the business, such as messaging system 151 or messaging system 153 shown in FIG. 3. The messaging session occurs after the business enters account information into a registration database and also after one or more message identifiers for use by a messaging identification system are also established for the business so that one or more messaging identification servers can properly identify the business and account information necessary to establish the messaging session in one embodiment. The messaging session can begin as shown in FIG. 7A with the user interface of the messaging application on the device or smartphone 401 shown or displayed on the screen of the device or smartphone 401. The user interface includes an on-screen keyboard 402 and an area immediately above the on-screen keyboard for entry of text, and an area above that for the display of a message transcript. Near the top of the screen is a "to" text entry field 403 into which a user can enter a name associated with the messaging account in the messaging system. In the example shown in FIG. 7B, the user has begun to enter the phrase "Apple support" into the "to" text entry field 403, and the device responds by displaying a messaging option 404 which can be selected to initiate a text messaging session with the business associated with this messaging account. The entry of text into the text entry field 403 may cause a search through contacts locally stored on smartphone 401 or remotely stored in one or more databases, such as a contact database in cloud storage or the maps database 163 or the database 165. The user can select the messaging option 404 by tapping or touching the messaging option 404 which can result in the messaging application presenting the user interface shown in FIG. 7C. In this user interface, the messaging application presents a set of possible topics which the user can select in a messaging session with a business; or a group within the business; the set of possible topics is shown as topic picker 405 which can result from (or be) the initial response from the business. In this instance, the group within the business is a support group which provides support to customers of the business. The user interface shown in FIG. 7C presents the topic picker 405 which allows the customer to pick one of the topics for the messaging session. In one embodiment, the topic can represent an intent identifier or a group identifier for purposes of the messaging session and this data about the intent and group can be passed back and forth, in a manner which is similar to how cookies are passed back and forth in a web browsing session. The passing of the intent and group information back and forth during the messaging session allows a business to categorize a messaging session in order to appropriately deal with the messaging session both in terms of who or what group within a business handles the messaging session and the purpose of the messaging session and also how the messaging session can be structured in function and operation. In one embodiment, after the user selects a topic from the topic picker 405, the messaging application can present the next user interface shown in FIG. 7D, in which bubble 407 is shown in the message transcript 408. Bubble 407 is an example of an initial response from a business after a messaging session has been initiated. In one embodiment, this initial response can include an estimated response time or estimated wait time. In the example shown in FIG. 7D, the message in message bubble 407 requests that the user send questions to the business, which the user does as shown in FIG. 7E in which the user has entered text into the text staging area 409 and then causes that text to be sent as the next message in the messaging session as shown in FIG. 7F. The message transcript 408 shown in FIG. 7F now includes message bubble 407 and message bubble 411. As shown in FIG. 7D, at some point during the messaging session an alert 415 is presented on the smartphone 401 asking the user whether the user will allow the business to access certain user information in connection with the user during the messaging session. In this case, information about the customer relative to the business may be stored on the smartphone 401 or may be stored remotely in a database of the business, and in either case, the user is asked to allow or not allow the use of that information as part of the messaging session. If the user selects the allow option 414, then the messaging session can use that information and the user of smartphone 401 will not need to enter that information separately during the messaging session if it turns out that the information is required for purposes of the messaging session. If the user selects the "don't allow" option 413 then the user may have to enter such information during the messaging session. It will be appreciated that the alert 415 can be presented at different times during the messaging session, such as near the end of the messaging session rather than the beginning of a messaging session. A further response is received by the smartphone 401 as shown in FIG. 7F, in which two additional message bubbles are now shown in the message transcript 408. In particular, message bubble 417 and message bubble 419 now appear within the message transcript 408. Message bubble 419 asks the user whether the user would like to schedule an appointment to repair smartphone 401. As shown in FIG. 7I, the user's smartphone 401 responded to the message in message bubble 419 with the message shown within message bubble 421, which indicates that the user does want to schedule an appointment for a repair. In response, the business responds with bubble 423 and an image 424 and a scheduling button 425. In response to the selection of the scheduling bubble 425 a set of one or more available stores are displayed within the messaging application as shown in FIG. 7J. In the example of FIG. 7J, several available locations to schedule an appointment include locations 427 and 428. The user can then select one of the locations which can result in the display of available times at that location as shown in FIG. 7K. The messaging application as shown in FIG. 7K now displays a set of dates 430 and available times at the particular location, including time 429 which the user can select which will then cause the messaging app to send the user's selection of the location and the time back to the business when the user selects the send button 433 in FIG. 7L. The selection of the time 429 as shown in FIG. 7K can result in the display of the user interface shown in FIG. 7L, in which the selected option 431 for both the location and the time are shown before the message is sent. After the message is sent by the selection of the send button 433, the message bubble 431A appears in the transcript 408, and then the business responds with the message shown in message bubble 433 which confirms the appointment at a particular location selected by the user and at the time and date selected by the user. Further messages can be exchanged between the customer and the business as shown in FIG. 7N by the additional message bubbles 436 and 437 which appear after message bubble 435 within the transcript 408.

Figure 8B:
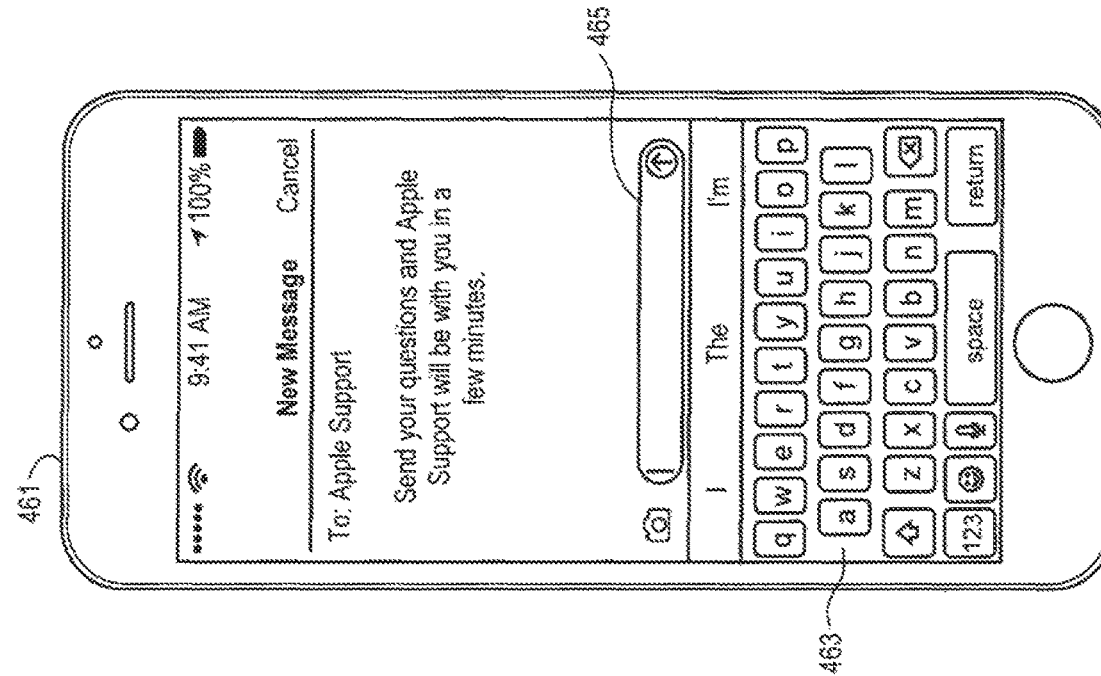
FIGS. 8A and 8B show an alternative embodiment for picking a topic of a messaging session with a business.
Figure 8A:
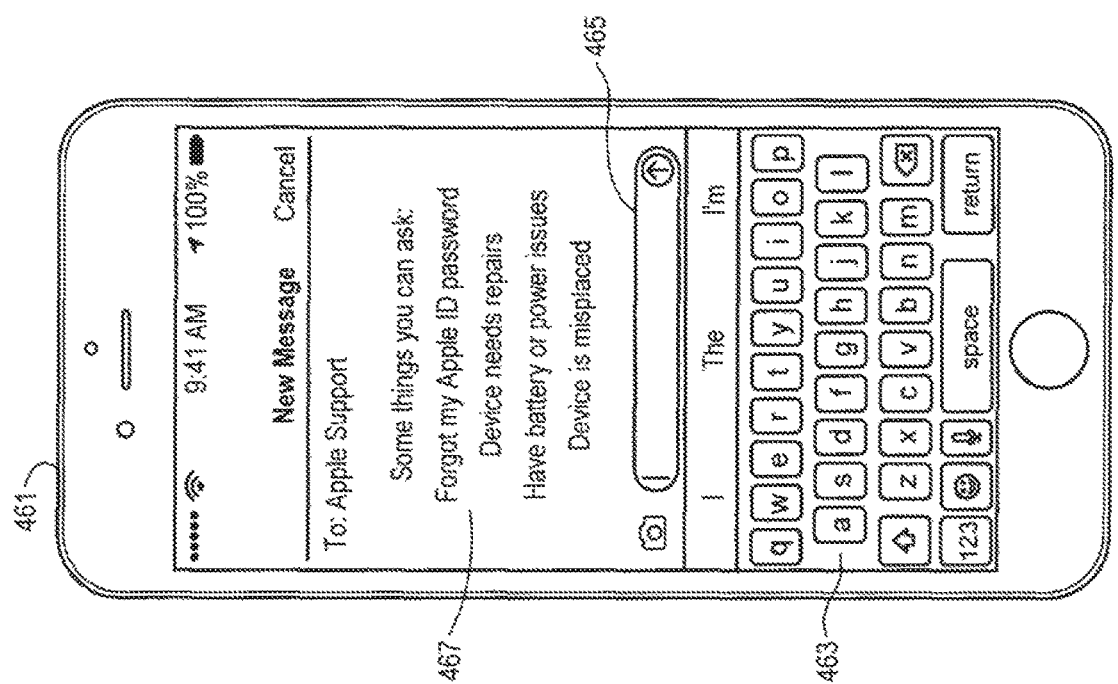

FIGS. 8A and 8B show an alternative embodiment for a topic picker which is shown as topic picker 467, which suggests possible questions or topics for a user to enter into the text staging area 465 using the on-screen keyboard 463. In the example shown in FIGS. 8A and 8B, the messaging application in one embodiment has already established a messaging session with the business and the business can respond with a topic picker 469 to guide the user through the process of selecting a topic which in one embodiment can be an intent identifier or a group identifier depending on how the business wants to define a messaging session.

Figure 9B:
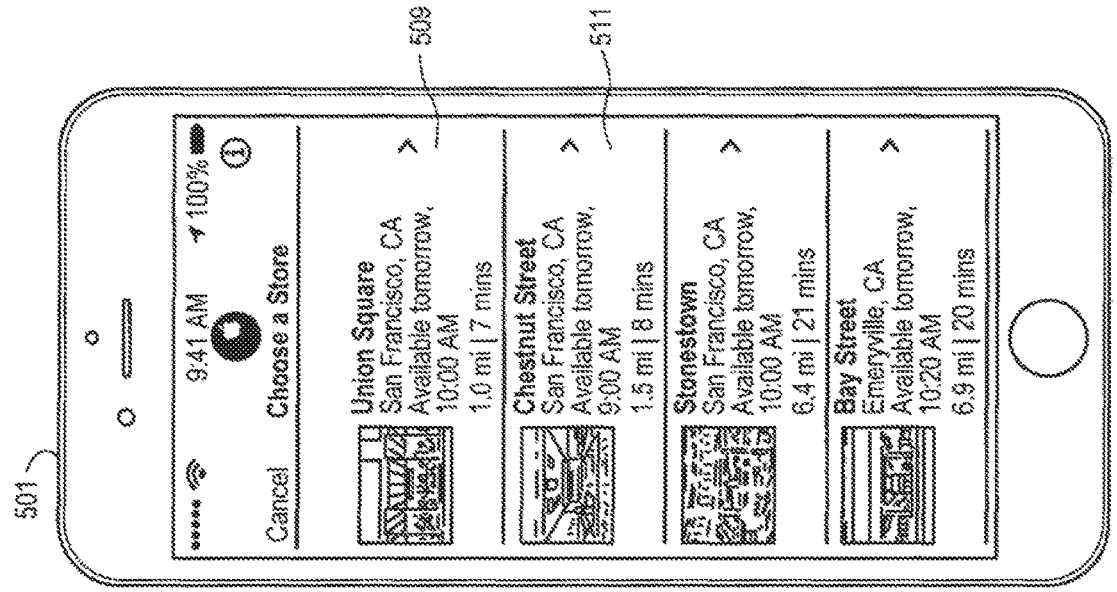
Figure 9A:
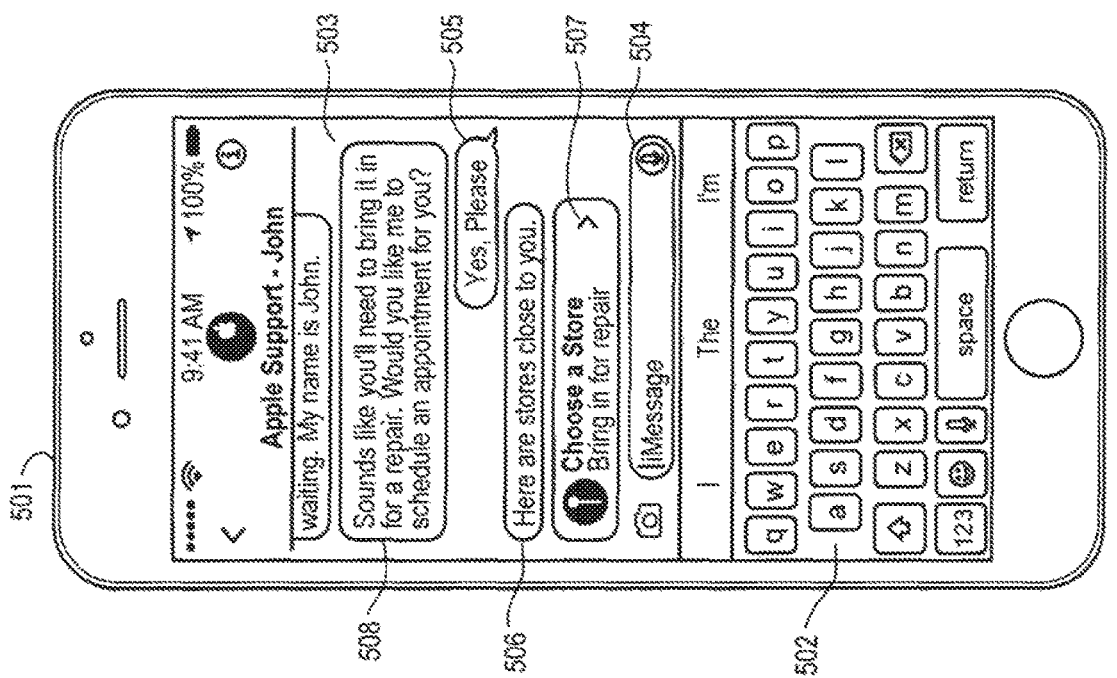
Figure 9C:
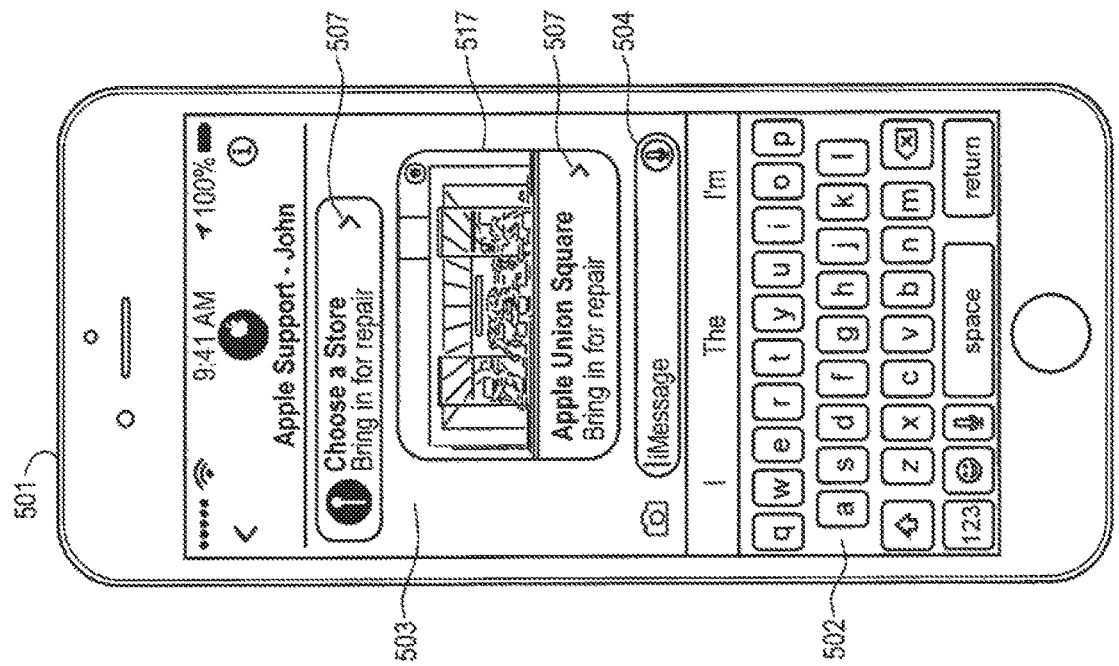
Figure 9D:
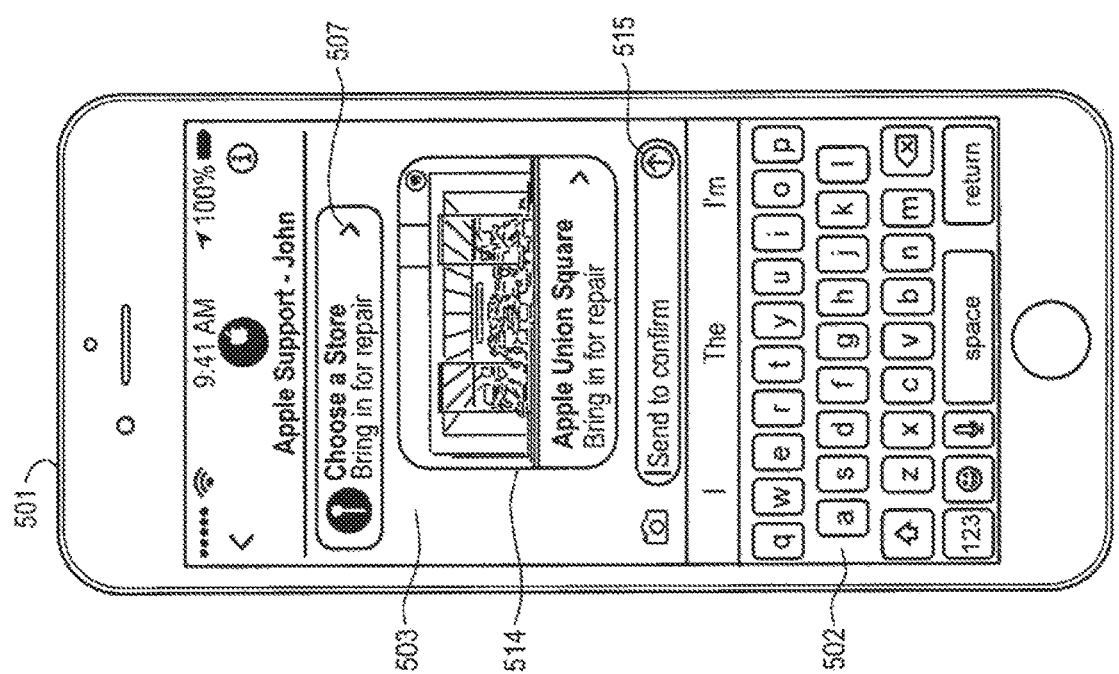

FIGS. 9A, 9B, 9C, 9D, 9E, and 9F show an alternative embodiment for scheduling an appointment in a messaging session. In this embodiment, the user of a smartphone 501 has initiated a messaging session with the business and the message transcript 503 includes message bubbles 508, 505, and 506 along with the store selector which includes a store selector button 507 which the user can select to cause the display of the user interface within the messaging application shown in FIG. 9B. The smartphone 501 also includes an on-screen keyboard 502 and a text staging area 504 shown within the user interface of the messaging application. In the user interface for the store selector shown in FIG. 9B, one or more store locations can be presented, such, as locations 509 and 511 which the user can select. In the example shown in FIG. 9B, the user has selected the store location at Union Square causing the messaging application to present an image of the store at Union Square as image 514. The user can send the selected store location by selecting the send button 515. Once the send button 515 is selected, the selected store is sent back in the messaging session to the business and now appears within the message transcript 503 in the message bubble 517 shown in FIG. 9D. The business can then respond in the messaging session by sending back text within the message bubble 519, which prompts the user to select one of the available times at the selected location. The user can then select the time selector button 520 to cause the presentation within the messaging application of available times and dates as shown in FIG. 9F. The user can select one of the dates along dates input region 523 and one of the times such as times 525 and 524. Once the user has selected a date and a time, a message can be sent back to the business with the selected date and time, for the previously selected store, which causes the message bubble 517 to be updated as message bubble 517B after the user selects the send button 515 shown in FIG. 9G. The selection of the send button 515 causes the selection of the time for the previously selected store to be transmitted as another message in the messaging session, and the business can respond with a confirmation message shown within message bubble 531. Further additional message bubbles can also reflect further messages (such as message bubbles 535 and 537) in the messaging session after the confirmation shown within message bubble 531.

Figure 10A:
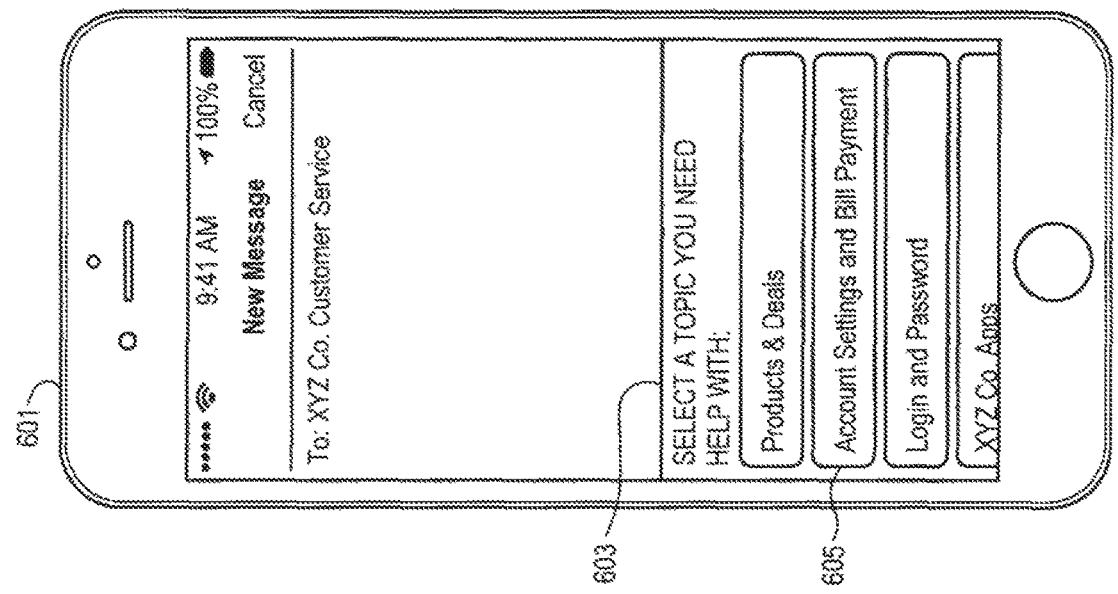
Figure 9I:
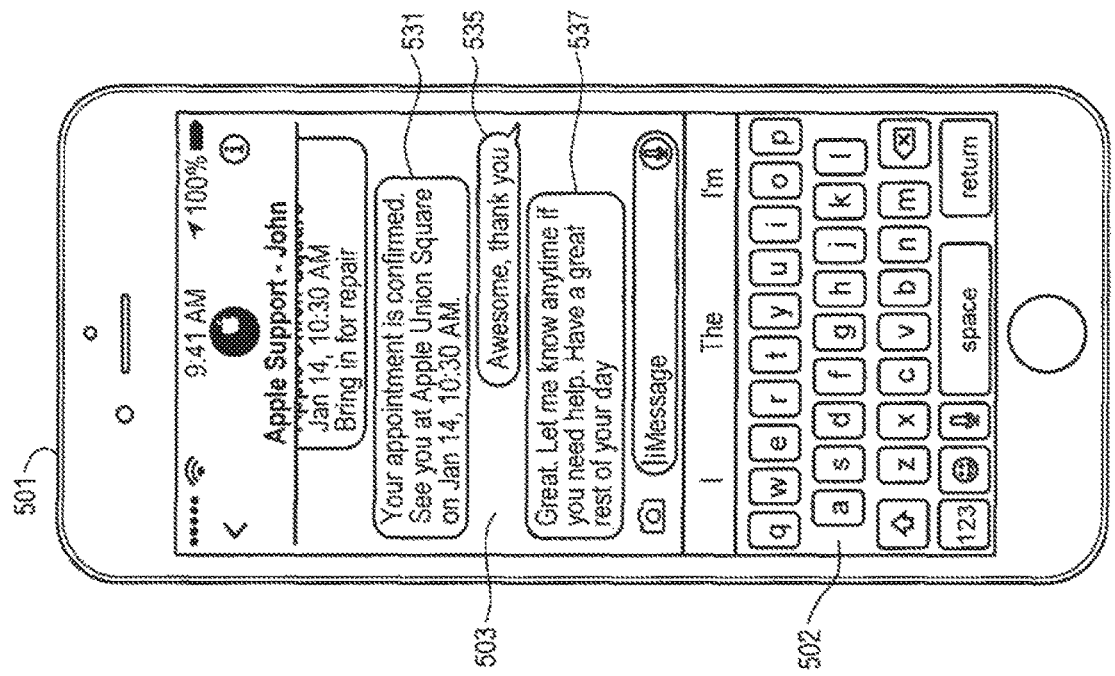

FIGS. 10A, 10B, and 10C illustrate an embodiment in which user information or customer information can be provided to a business during a messaging session with the business. In this example, a user is using smartphone 601 to conduct a messaging session with a business from which the user buys goods or services. The beginning of the messaging session can include the display of a topic picker 603 which can be a message sent from the business to the user as a response to the initial text message from the user or as a response to the initiation of the messaging session with the business. In the example shown in FIG. 10A, the topic picker includes a topic "account settings and bill payment" as option or topic 605. In this instance, the user selects topic 605 causing the presentation of the user interface of the messaging app shown in FIG. 10B. The messaging app includes the message transcript 607 and two message bubbles 609 and 611 along with an on-screen keyboard 602. Message bubble 609 shows that the business has responded to the selected topic of topic 605 with a message indicating the estimated response or wait time in message bubble 609. In response, the user enters a question as shown in message bubble 611 and at some point, the business can respond with a request for user information from the user, such as a user name or password or more, depending on the information required by the business. The user can enter the user requested information and then select the sign in button 615 to continue the messaging session with the business. In one embodiment, if the user has already been authenticated within the business's on-device application or web site (e.g., through entry of a user name and password), then the business may use the authentication within the messaging application and not require the user to re-enter the authentication credentials. In an embodiment, a payment option presented to the user can be Apple Pay. If use of Apple Pay is selected, a place card displacing an itemized bill can be displayed.

FIGS. 11A, 11B, and 11C show an example of how a user can obtain information about the business during a messaging session. In this example, the user is near the end of a messaging session shown in the example provided above relative to FIGS. 7A through 7N. FIG. 11A shows the end of that messaging session on smartphone 401 and shows that an information button 439 is available for the user to select which can cause the display of information shown in FIG. 11B. This information includes options which can be selected including contact option 445 to display contact information 449 shown in FIG. 11C for the business. This contact information 449 can include location information, website information, one or more phone numbers and other information. Moreover, the contact information can also include user selectable options to initiate a phone call or a messaging session or display information about a location on a map. As shown in FIG. 11B, the information about the business can include various selectable options that allow the user to send the user's current location (option 441), or share the user's current location (option 442) or take other actions such as requesting that the user not be disturbed (option 443). In addition, the details shown in the user interface of FIG. 11B can include additional options 444 to cause the presentation of other information about the business or the user's account with the business.

In one embodiment, a messaging session between a user and a business can exist (and remain stored in a transcript on the user's device) until the session is closed by the user. A user can, in one embodiment, manage their messaging preferences by, for example, selectively unsubscribing from specific types of messages or selectively muting (e.g., turning off notifications) specific types of messages or by "muting" an entire conversation so that the user continues to receive messages in the background without the presentation (e.g., alerts or sounds or display of alerts) of notifications. Some messages in a conversation with a business can cause a notification (e.g., a sound or displayed alert or both) to be presented (when the messaging application is a background application) while other types of messages may not cause any notifications. In one embodiment, the notification can be displayed on a lock screen (when the device is locked) if the message has a high priority, while low priority messages may not be displayed on the lock screen.

In one embodiment, a business can use its messaging session with a user to invoke a business process or flow. For example, a messaging extension application of the business can be invoked within the messaging application to process information or control the flow of the messaging session according to the business's desired business process or flow. For example, a user can request, through aa initiated messaging session, an airline to change a seating arrangement, and the airline's messaging extension application can impose or direct a business process or flow to cause the user to follow the process or flow in order to change a seating arrangement on an airplane. Further, a business can set a flag on some of its messages so some of those messages are not replyable (the user cannot reply to the message that has been "flagged" by the business).

In another embodiment, a messaging session with a business can involve two or more persons or devices and the business who interact through the conversation with a customer of the business. For example, a user can initiate a service request with a business and begin the messaging session with a first employee of the business and the session continues after a second employee joins the session.

In one embodiment, a user's device can use its determined location to notify (through a notification) a user that a messaging session can be initiated (or resumed) based upon the determined location. For example, if the user is near a store of a business and has recently been involved in a messaging session with the business, the user's device can, using location techniques such as GPS, etc. determine the proximity to the store and determine that a recent messaging session involves the store or business and in response the user's device can present a notification to ask if the user would like to resume the messaging session.

The systems and methods described herein can be implemented in a variety of different data processing systems and devices, including general-purpose computer systems, special purpose computer systems, or a hybrid of general purpose and special purpose computer systems. Exemplary data processing systems that can use any one of the methods described herein include server systems, desktop computers, laptop computers, tablet computers, smart phones, cellular telephones, personal digital assistants (PDAs), embedded electronic devices, or consumer electronic devices.

Figure 12:
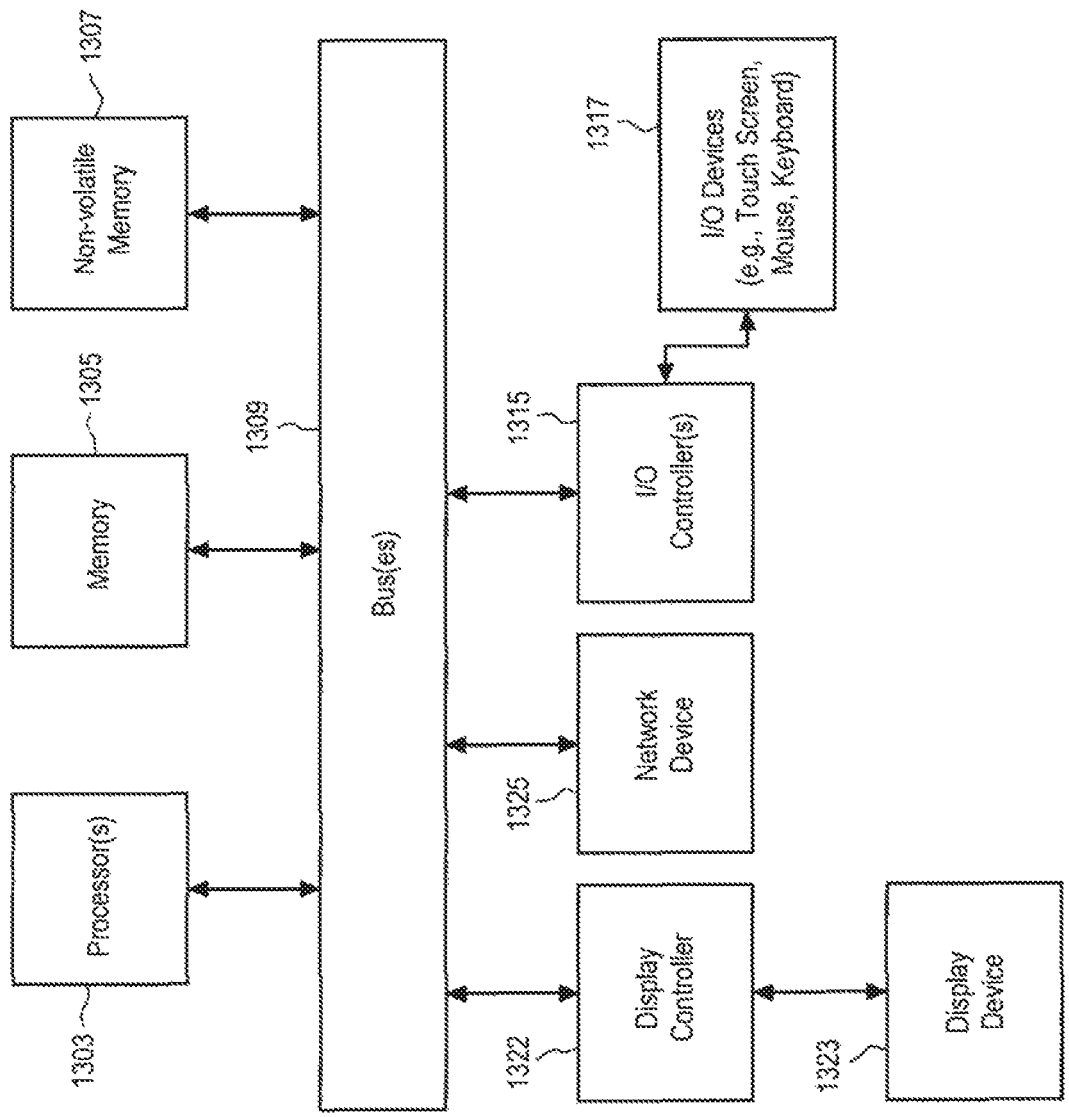
FIG. 12 is an example of a data processing system which can be used with one or more embodiments described herein.

FIG. 12 is a block diagram of data processing system hardware according to an embodiment. Note that while FIG. 12 illustrates the various components of a data processing system that may be incorporated into a mobile or handheld device or a server system, it is not intended to represent any particular architecture or manner of interconnecting the components as such details are not germane to the present invention. It will also be appreciated that other types of data processing systems that have fewer components than shown or more components than shown in FIG. 12 can also be used with the present invention.

As shown in FIG. 12, the data processing system includes one or more buses 1309 that serve to interconnect the various components of the system. One or more processors 1303 are coupled to the one or more buses 1309 as is known in the art. Memory 1305 may be DRAM or non-volatile RAM or may be flash memory or other types of memory or a combination of such memory devices. This memory is coupled to the one or more buses 1309 using techniques known in the art. The data processing system can also include non-volatile memory 1307, which may be a hard disk drive or a flash memory or a magnetic optical drive or magnetic memory or an optical drive or other types of memory systems that maintain data even after power is removed from the system. The non-volatile memory 130 and the memory 1305 are both coupled to the one or more buses 1309 using known interfaces and connection techniques. A display controller 1322 is coupled to the one or mom buses 1309 in order to receive display data to be displayed on a display device 1323. The display device 1323 can include an integrated touch input to provide a touch screen. The data processing system can also include one or more input/output (I/O) controllers 1315 which provide interfaces for one or more I/O devices, such as one or more mice, touch screens, touch pads, joysticks, and other input devices including those known in the art and output devices (e.g. speakers). The input/output devices 1317 are coupled through one or more I/O controllers 1315 as is known in the art.

While FIG. 12 shows that the non-volatile memory 1307 and the memory 1305 are coupled to the one or more buses directly rather than through a network interface, it will be appreciated that the present invention can utilize non-volatile memory that is remote from the system, such as a network storage device which is coupled to the data processing system through a network interface such as a modem or Ethernet interface. The buses 1309 can be connected to each other through various bridges, controllers and/or adapters as is well known in the art. In one embodiment the I/O controller 1315 includes one or more of a USB (Universal Serial Bus) adapter for controlling USB peripherals, an IEEE 1394 controller for IEEE 1394 compliant peripherals, or a Thunderbolt controller for controlling Thunderbolt peripherals. In one embodiment, one or more network device(s) 1325 can be coupled to the bus(es) 1309. The network device(s) 1325 can be wired network devices (e.g., Ethernet) or wireless network devices (e.g., WiFi, Bluetooth).

It will be apparent from this description that aspects of the present invention may be embodied, at least in part, in software. That is, the techniques may be carried out in a data processing system in response to its processor executing a sequence of instructions contained in a storage medium, such as a non-transitory machine-readable storage medium (e.g. volatile DRAM or non-volatile flash memory). In various embodiments, hardwired circuitry may be used in combination with software instructions to implement the present invention. Thus the techniques are not limited to any specific combination of hardware circuitry and software, or to any particular source for the instructions executed by the data processing system. Moreover, it will be understood that where mobile or handheld devices are described, the description encompasses mobile devices (e.g., laptop devices, tablet devices), speaker systems with integrated computing capabilities, handheld devices (e.g., smartphones), as well as embedded systems suitable for use in wearable electronic devices.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A non-transitory machine-readable medium storing instructions which when executed by a data processing system cause the data processing system to perform a method comprising:

displaying a messaging option for a first organization;

receiving, on a user device, a selection of the messaging option;

responsive to the selection, launching a user interface for a messaging application with at least a portion of first account information corresponding to the first organization in a text entry field of the user interface;

receiving, on the user device, a request to send an initial message from a user to the first organization;

displaying, in a message transcript of the user interface and following the request, the initial message from the user and an initial response from the first organization; and modifying, following the request and after sending the initial message from the user, a portion of the user interface that is separate from the message transcript that displays the initial message from the user to display, concurrently with the displayed initial message from the user, at least a portion of second account information corresponding to the first organization, wherein the portion of the second account information corresponding to the first organization was not displayed in the user interface prior to the modification.

2. The non-transitory machine-readable medium of claim 1, wherein the method further comprises displaying, in the user interface, additional account information that specifies whether a surrogate responds on behalf of the first organization and includes data specifying one or more limitations on an amount of messaging sessions that can be concurrently maintained or established with the first organization.

3. The non-transitory machine-readable medium of claim 1, wherein the initial response from the first organization displayed in the message transcript in the user interface of the messaging application includes an estimated response time or wait time.

4. The non-transitory machine-readable medium of claim 1, wherein one or more messaging servers are used by members of the public to send text messages and other content to other members of the public in addition to use by organizations to conduct messaging sessions with customers or users of the organizations.

5. The non-transitory machine-readable medium of claim 4, wherein the method further comprises establishing, in the messaging application, a long term messaging session between the user and the first organization that is stored on the user device as a transcript of a conversation, and wherein the long term messaging session can be recalled from storage on the user device after a last message in the conversation.

6. The non-transitory machine-readable medium of claim 1, wherein at least some of the first account information is stored on one or more of: (a) a message registry; or (b) a messaging identification system that uses one or more messaging identifiers of an organization to initiate a messaging session and wherein the messaging session is established by the messaging identification system providing connection information about one or more devices of the first organization which transmits messages through one or more messaging servers.

7. The non-transitory machine-readable medium of claim 1, wherein displaying the messaging option for the first organization comprises displaying, as at least a portion of a search result, the messaging option for the first organization.

8. The non-transitory machine-readable medium of claim 7, wherein the first account information is maintained with other account information for a plurality of organizations, including the first organization, by a messaging system that provides a messaging service to a plurality of user devices that each include a messaging application configured to send and receive messages through the messaging system, and wherein the search result is obtained from a search of one or more databases containing account information of the organization.

9. The non-transitory machine-readable medium of claim 8, wherein searches through the one or more databases provide multiple entry points to a messaging session with the first organization and the multiple entry points include at least two or more of: (a) a search using a web browser; (b) a search using a map application; (c) a search using a search utility application; or (d) a speech recognition assistant that causes a search to be performed.

10. The non-transitory machine-readable medium of claim 9, wherein the first account information and the other account information include, for each organization, at least one of the following: (a) a messaging identifier for use by a messaging identification system, the messaging identifier specifying a cloud storage account for sending, receiving, and storing messages; (b) brand information for an organization; (c) data specifying to whom, within an organization, a messaging session is directed; (d) location information for one or more stores or facilities of an organization; (e) a selected messaging services platform that acts as a helpdesk or surrogate for an organization; (f) data specifying one or more limitations on an amount of messaging sessions that can be concurrently maintained or established with an organization; or (g) one or more customizable fields that can be customized by an organization.

11. The non-transitory machine-readable medium of claim 9, wherein the search utility application searches through local indexed content on the user device and causes the search through the one or more databases containing account information of the plurality of organizations.

12. The non-transitory machine-readable medium of claim 8, wherein account information for a user's account with the first organization is automatically provided with or auto-populated in a message between the user device and the first organization.

13. The non-transitory machine-readable medium of claim 8, wherein at least one of the messages displayed in the user interface of the messaging application includes first data specifying a purpose or intent for the messages and second data specified by the first organization; and wherein the one or more databases provide multiple entry points to a messaging session with the first organization; and wherein the multiple entry points include at least two or more of: (a) a search using a web browser; (b) a search using a map application; (c) a search using a search application configured to search local content and remote content; and (d) a speech recognition assistant configured to receive and respond to search queries.

14. The non-transitory machine-readable medium of claim 1, wherein the initial response from the first organization includes at least a portion that is selectable by the user from within the messaging application to generate a next message from the user to the first organization.

15. A method comprising:
displaying a messaging option for a first organization;
receiving, on a user device, a selection of the messaging option;
responsive to the selection, launching a user interface for a messaging application with at least a portion of first account information corresponding to the first organization in a text entry field of the user interface;
receiving, on the user device, a request to send an initial message from a user to the first organization;
displaying, in a message transcript of the user interface and following the request, the initial message from the user and an initial response from the first organization; and
modifying, following the request and after sending the initial message from the user, a portion of the user interface that is separate from the message transcript that displays the initial message from the user to display, concurrently with the displayed initial message from the user, at least a portion of second account information corresponding to the first organization, wherein the portion of the second account information corresponding to the first organization was not displayed in the user interface prior to the modification.

16. The method of claim 15, further comprising displaying, in the user interface, additional account information that specifies whether a surrogate responds on behalf of the first organization and includes data specifying one or more limitations on an amount of messaging sessions that can be concurrently maintained or established with the first organization.

17. The method of claim 15, wherein the initial response from the first organization displayed in the user interface of the messaging application includes an estimated response time or wait time.

18. The method of claim 15, wherein the first account information is maintained with other account information for a plurality of organizations, including the first organization, by a messaging system that provides a messaging service to a plurality of user devices that each include a messaging application configured to send and receive messages through the messaging system, and wherein the messaging option is displayed in a search result that is obtained from a search of one or more databases containing account information of the organization.

19. The method of claim 18, wherein searches through the one or more databases provide multiple entry points to a messaging session with the first organization and the multiple entry points include at least two or more of: (a) a search using a web browser; (b) a search using a map application;

(c) a search using a search utility application; or (d) a speech recognition assistant that causes a search to be performed.

20. The method of claim 19, wherein the first account information and the other account information include, for each organization, at least one of the following: (a) a messaging identifier for use by a messaging identification system, the messaging identifier specifying a cloud storage account for sending, receiving, and storing messages; (b) brand information for an organization; (c) data specifying to whom, within an organization, a messaging session is directed; (d) location information for one or more stores or facilities or an organization; (e) a selected messaging services platform that acts as a helpdesk or surrogate for an organization; (f) data specifying one or more limitations on an amount of messaging sessions that can be concurrently maintained or established with an organization; or (g) one or more customizable fields that can be customized by an organization.

21. The method of claim 19, wherein the search utility application searches through local indexed content on the user device and causes the search through the one or more databases containing account information of the plurality of organizations.

22. The method of claim 18, wherein account information for an account of the user with the first organization is automatically provided with or auto-populated in a message between the user device and the first organization.

23. The method of claim 18, wherein at least one of the messages displayed in the user interface of the messaging application includes first data specifying a purpose or intent for the messages and second data specified by the first organization; and
wherein the one or more databases provide multiple entry points to a messaging session with the first organization; and
wherein the multiple entry points include at least two or more of: (a) a search using a web browser; (b) a search using a map application; (c) a search using a search application configured to search local content and remote content; and (d) a speech recognition assistant configured to receive and respond to search queries.

24. The method of claim 15, wherein one or more messaging servers are used by members of the public to send text messages and other content to other members of the public in addition to use by organizations to conduct messaging sessions with customers or users of the organizations.

25. The method of claim 24, wherein the method further comprises establishing, within the messaging application, a long term messaging session between the user and the first organization that is stored on the user device as a transcript of a conversation, and wherein the long term messaging session can be recalled from storage on the user device after a last message in the conversation.

26. The method of claim 15, wherein at least some of the first account information is stored on one or more of: (a) a message registry; or (b) a messaging identification system that uses one or more messaging identifiers of an organization to initiate a messaging session and wherein the messaging session is established by the messaging identification system providing connection information about one or more devices of the first organization which transmits messages through one or more messaging servers.

27. A device comprising:
a memory; and
at least one processor configured to:
display a messaging option for an organization;
receive a selection of the messaging option;
responsive to the selection, launch a user interface of a messaging application with at least a portion of first account information corresponding to the organization in a text entry field of the user interface;
receive, on the device, a request to send an initial message from a user to the organization; and
modify, following the request and after sending the initial message from the user, a portion of the user interface that is separate from a message transcript that displays the initial message from the user to display second account information corresponding to the organization, wherein the portion of the second account information corresponding to the organization was not displayed in the user interface prior to the modification.

28. The device of claim 27, wherein the second account information comprises brand information for the organization.

29. The device of claim 27, wherein the at least one processor is further configured to:
prevent the display of the messaging option for the organization when a messaging limitation condition for the organization is satisfied.

30. The device of claim 27, wherein the at least one processor is further configured to:
auto-populate, in the messaging application, a message with information associated with an account of the user, the account being associated with the organization.

* * * * *